United States Patent
Berman

(10) Patent No.: US 9,835,488 B2
(45) Date of Patent: Dec. 5, 2017

(54) LUGGAGE SCALE AND IDENTIFICATION TAG SYSTEM

(71) Applicant: Paul Alan Berman, Santa Monica, CA (US)

(72) Inventor: Paul Alan Berman, Santa Monica, CA (US)

(*) Notice: Subject to any disclaimer, the term of this patent is extended or adjusted under 35 U.S.C. 154(b) by 0 days.

(21) Appl. No.: 15/176,951

(22) Filed: Jun. 8, 2016

(65) Prior Publication Data

US 2016/0305815 A1    Oct. 20, 2016

Related U.S. Application Data

(63) Continuation-in-part of application No. 14/214,689, filed on Mar. 15, 2014, now abandoned.

(51) Int. Cl.
| | |
|---|---|
| *G01G 19/52* | (2006.01) |
| *G01G 19/58* | (2006.01) |
| *G01G 3/00* | (2006.01) |
| *G01G 3/08* | (2006.01) |
| *G09F 3/14* | (2006.01) |
| *G09F 3/02* | (2006.01) |

(52) U.S. Cl.
CPC ............ *G01G 19/58* (2013.01); *G09F 3/14* (2013.01); *G01G 3/08* (2013.01); *G01G 19/52* (2013.01); *G09F 2003/0254* (2013.01)

(58) Field of Classification Search
CPC .. G01G 3/02; G01G 3/06; G01G 3/08; G01G 3/13; G01G 19/52; G01G 19/54; G01G 19/56; G01G 19/58; G01G 21/28; G09F 3/02; G09F 2003/0254; G09F 3/14
See application file for complete search history.

(56) References Cited

U.S. PATENT DOCUMENTS

| | | | | |
|---|---|---|---|---|
| 152,195 A * | 6/1874 | Turnbull | ............ | G01G 3/02 177/234 |
| 294,227 A * | 2/1884 | Haerter | ............ | G01G 3/02 177/231 |
| 324,465 A * | 8/1885 | Fuchs | ............ | G01G 3/02 177/127 |
| 791,554 A * | 6/1905 | Hathaway | ............ | G01G 3/02 177/17 |
| 1,001,666 A * | 8/1911 | McGuire | ............ | G01G 3/02 177/234 |
| 1,527,048 A * | 2/1925 | Le Blanc | ............ | G01G 3/02 177/17 |
| 2,518,973 A * | 8/1950 | Atherton | ............ | A45C 13/28 177/131 |

(Continued)

FOREIGN PATENT DOCUMENTS

JP    2007-053509 A  *  3/2007

*Primary Examiner* — Randy Gibson
(74) *Attorney, Agent, or Firm* — Integrity Patent Group, PLC; Edwin Wold

(57) ABSTRACT

A luggage scale and identification tag system is a combination identification tag and luggage weight scale system having a body with a clear plastic card insert for displaying a business card or other visual identification means on one side and a scale with a display face and graduated weight measurements on the other side. The scale has a spring mechanism that is able to indicate a weight when loaded; the indication via mechanical (analog) means. Simplified versions may just be connectable to luggage via a tie strap.

21 Claims, 26 Drawing Sheets

(56) References Cited

U.S. PATENT DOCUMENTS

| | | | | |
|---|---|---|---|---|
| 2,710,083 A * | 6/1955 | White | ............... | A45C 13/28 177/148 |
| 2,759,577 A * | 8/1956 | White | ............... | G01G 19/58 177/148 |
| 2,937,016 A * | 5/1960 | Westman | ............... | A45C 13/28 177/131 |
| 3,090,454 A * | 5/1963 | Farrar | ............... | A45C 13/28 177/131 |
| 4,936,399 A * | 6/1990 | Christman | ............... | G01G 19/18 177/148 |
| 5,802,764 A * | 9/1998 | Nucci | ............... | A01G 27/008 47/39 |
| 6,429,391 B1 * | 8/2002 | Gruver | ............... | G01G 19/14 177/148 |
| 7,232,961 B1 * | 6/2007 | Godshaw | ............... | G01G 19/58 116/293 |
| 7,281,615 B2 * | 10/2007 | Siwak | ............... | A45C 13/28 16/114.1 |
| 8,485,329 B1 * | 7/2013 | Roy | ............... | A45C 13/28 177/149 |
| 8,766,111 B2 * | 7/2014 | Lee | ............... | G01G 19/58 177/126 |
| 8,853,565 B2 * | 10/2014 | Kritzler | ............... | G01G 19/58 177/126 |
| 2006/0207850 A1 * | 9/2006 | Lewis | ............... | A45C 13/28 190/115 |
| 2007/0007048 A1 * | 1/2007 | Gill | ............... | G01G 19/58 177/131 |
| 2007/0056779 A1 * | 3/2007 | Laniado | ............... | A43C 11/00 177/245 |
| 2007/0163813 A1 * | 7/2007 | Lewis | ............... | G01G 19/58 177/148 |
| 2010/0116559 A1 * | 5/2010 | Moon | ............... | G01G 19/58 177/25.13 |
| 2010/0181354 A1 * | 7/2010 | Laniado | ............... | A43C 11/165 224/259 |
| 2010/0325060 A1 * | 12/2010 | McIntosh | ............... | E05B 67/383 705/333 |
| 2011/0186356 A1 * | 8/2011 | Sheikh | ............... | G01G 19/414 177/25.13 |
| 2011/0186357 A1 * | 8/2011 | Sheikh | ............... | G01G 19/58 177/148 |
| 2014/0102813 A1 * | 4/2014 | Lin | ............... | A45C 13/30 177/126 |

* cited by examiner

LUGGAGE SCALE AND IDENTIFICATION TAG SYSTEM

CROSS-REFERENCE TO RELATED APPLICATIONS

The present application is a continuation in part and relates to and claims priority from pending non-provisional utility patent application Ser. No. 14/214,689, filed Mar. 15, 2014, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of portable devices for use in measuring the weight of luggage items and more specifically relates to a luggage scale and identification tag.

2. Description of the Related Art

Many individuals in modern society travel between locations using air travel. Typically, the traveler brings luggage on these trips; the luggage filled with items to be used during the trip. The volume of luggage taken on these trips may cause more fuel to be consumed by the aircraft. Airlines, to remain cost-effective, may counteract this by charging overweight baggage fees as a deterrent to keep the weight of the onboard luggage at reasonable levels. Overweight luggage is often assessed on each bag over a certain allowable weight limit per bag. The airline passengers must either pay the assessed fees or alternately leave their luggage at home. As such it would be convenient if the weight of each of the luggage items was known or could be readily be made known.

Airlines often have scales to weigh luggage bags, but passengers normally do not have an accurate scale readily available for determining the weight of their luggage. Scales designed and used for weighing other items would occupy valuable space in luggage, thus are inconvenient to use. Attaching a scale to the outside of luggage where it does not take up space within the suitcase exposes it to potential damage from the typical rough handling that luggage receives in airport luggage handling areas. Expensive or even moderately priced scales are less desirable to the outside of luggage because of the possibility of theft or damage. Conventional scales may be difficult to read and may be easily damaged. Since many suitcases weigh 50 to 100 pounds and are difficult to lift, it would be desirable to be able to read the weight of the suitcase on the scale without lifting the suitcase high off the ground. Thus, a suitable, low cost, damage resistant, portable and accurate weighing means which can be attached to the outside of a suitcase is desirable.

Many travelers wish to mark their luggage for ease of recognition. Conventional baggage tags with a lightweight elastic string may be placed around the handle when checking the baggage. The owner's name and contact information may be identified thereon. These tags are typically of a disposable type and often get torn from the luggage during handling which may lead to loss of the luggage. It is desirable to have a means for identifying a traveler's luggage, at a glance, such that the bag can be differentiated from other similar baggage items belonging to other travelers. Most tags are not unique and the tag may have to actually be read to identify one's own luggage. An inexpensive innovation that is multifunctional to solve the above-mentioned deficiencies and thereby increase traveler convenience is desirable.

Various attempts have been made to solve problems found in the scale and identification art for use with luggage. Among these are found in: U.S. Patent and Publication Nos. 7,281,615; 2011/0186356; 2007/0007048; 2006/0207850; and 2010/0325060. This prior art is representative of luggage weighing and identification means.

None of the above inventions and patents, taken either singly or in combination, is seen to describe the invention as claimed. Thus, a need exists for a reliable luggage scale and identification tag that operates reliably and is able to be manufactured at a modest expense to avoid the above-mentioned problems.

BRIEF SUMMARY OF THE INVENTION

The present invention advantageously fills the aforementioned deficiencies by providing convenience for weighing luggage (while traveling) and also incorporating a 'visually personalized' identification system. The present invention is superior to other systems in that it effectively combines the functions of an identification tag with a portable luggage scale.

In a most preferred embodiment of a luggage scale and identification tag system the present invention comprises a luggage scale and identification tag assembly having a housing with a hollow interior cavity, at least one upper side, a lower side, and a front side, a scale mechanism contained within confines of the hollow interior cavity of the housing, a cord connected to the scale mechanism near the lower side of the housing, identification attached to the housing, and a weight display. The luggage scale and identification are in functional combination.

The luggage scale is structured and arranged with the cord for attachment to a suitcase comprising luggage. The luggage scale and identification tag assembly comprises the housing, the scale mechanism, the identification, the cord, and the weight display in functional combination. The housing comprises the hollow interior cavity, parameters of the hollow interior cavity are defined by the at least one upper side, the lower side, and the front side. The scale mechanism may comprise a mostly flat deformation member able to sense a weight of the luggage attached to the cord during a weigh-in-period. The identification is able to display information related to an owner of the luggage. The weight display provides a visual means whereby a user is able to readily determine the weight of the luggage held by the cord. The luggage scale and identification allows the user to weigh the luggage in a remote location to determine the weight of the luggage. The identification is removable from an identification tag compartment.

In certain audible-enabled embodiments the luggage scale and identification tag system comprises a luggage scale and identification tag assembly having a housing with a hollow interior cavity, at least one upper side, a lower side, and a front side, a scale mechanism contained within confines of the hollow interior cavity of the housing, a cord connected to the scale mechanism near the lower side of the housing, an audible sounder, and identification holder in functional combination with the housing. The luggage scale and identification system comprises the luggage scale and identification assembly. The scale mechanism is structured and arranged with the audible sounder such that the audible sounder sounds for a suitcase weighing greater than a pre-determined suitcase weight. The luggage scale and identification assembly comprises the housing, the scale mechanism, the identification, the cord, and the weight display in functional combination.

The housing comprises the hollow interior cavity; parameters of the hollow interior cavity are defined by the at least one upper side, the lower side, and the front side. The scale mechanism preferably comprises a mostly flat deformation member able to sense a weight of luggage attached to the cord during a weigh-in-period whereby the mostly flat deformation member is deformed by the weight of luggage attached to the cord. The luggage scale is able to indicate to an owner of the luggage user if the weight exceeds a predetermined amount.

The luggage scale and identification system allows the user to weigh the luggage in a remote location to determine if the weight of the luggage exceeds the predetermined amount. The front side of the housing is transparent in order to allow viewing of an identification tag. The identification is removable from an identification tag compartment. The spring and cord combination once separated renders the luggage scale and identification tag assembly unusable for weighing. The spring and combination comprises a flexible locking cable tie. The weight display may include a magnifying lens.

The scale mechanism in certain embodiments includes a spine located near its center with ribs on either side that are attached to the housing of the luggage scale and identification tag assembly. The scale mechanism comprises a bell crank that is connected to the cord. The luggage scale and identification assembly is able to emit an audible signal when a pre-determined-weight has been exceeded. The weight display comprises a pointer.

In a preferred embodiment, a luggage scale and identification system comprising a luggage scale and identification assembly having a housing with a hollow interior cavity, at least one upper side, a lower side, and a front side, a scale mechanism contained within confines of the hollow interior cavity of the housing, a cord connected to the scale mechanism near the lower side of the housing, an identification holder on the housing, and a weight display.

The luggage scale and identification system comprises the luggage scale and identification assembly. The luggage scale and identification assembly comprises the housing, the scale mechanism, the identification holder, the cord, and the weight display in functional combination. The housing comprises the hollow interior cavity, parameters of the hollow interior cavity are defined by the at least one upper side, the lower side, and the front side. The scale mechanism comprises a mostly flat deformation member normally in tension able to sense a weight of luggage attached to the cord during a weigh-in-period whereby the mostly flat deformation member is deformed when the cord is pulled in a downward direction.

The identification holder is able to display information related to an owner of the luggage. The weight display provides a visual means whereby a user is able to readily determine the weight of the luggage held by the cord. The luggage scale and identification tag system allows the user to weigh the luggage in a remote location to determine the weight of the luggage. The front side of the housing comprises indicia useful to make a visual determination of the weight of the luggage held by the cord. The weight display comprises a rotating pointer with a pivot for the rotating pointer located near a top of the housing.

The mostly flat deformation member may comprise a centrally located vertical spine with a plurality of ribs connected to the spine and to the housing of the luggage scale. The mostly flat deformation member is preferably attached to a tie strap at its lower end. The tie strap is releasable. Deformation of the mostly flat deformation member causes rotation of a pointer. The lower side of the housing comprises a flange to increase surface area contact on a hand of the user whereby downward force is dispersed into hand via the flange to minimize discomfort during the weigh-in-period.

The present invention as disclosed herein relates to a portable device (and various embodiments thereof) for measuring the weight of luggage items. The device also serves to function as an identifying tag for a luggage item, and can be secured to an exterior part of a luggage item. This particular tag bears the traveler's identifying information, and may also display or contain the traveler's business card, or display some other mark or insignia or distinctive color which aids the traveler in identifying which baggage items are the property of the traveler. In this context, the present invention comprises a portable device that combines the benefits of a luggage scale with the benefits of a luggage tag into a single multi-purpose device. This multi-purpose device can be securely attached to a piece of luggage, survive impact forces encountered during travel, and can be used by a traveler to determine whether the luggage weight limit has been exceeded without lifting the luggage to an elevated position above the ground surface in order to view the weight of the luggage.

A first embodiment comprises a transparent housing having a front housing and a rear housing; the coupled front housing and the rear housing together in combination providing a cavity therein forming an inner volume. The transparent housing may be suitably shaped to provide magnification of the identifying indicia held within the inner volume of the housing in certain embodiments. A viewport is preferably located near the top of the housing, and allows the user to view the weight displayed on the weight indicator. The cavity (inner volume) formed between the front housing and the rear housing houses the weight measurement mechanism of the scale, which includes a bell crank, and a spring. A blind hole located on (and normal to) the lower rear face of the front housing holds the axle. Spring guides may be integrally molded with the front housing, and consist of two parallel walls perpendicular to the front face of the front housing that are separated by a distance that is large enough to contain the spring. A cord connects the cord connector with a clasp, and is of sufficient strength to support the weight of the luggage being weighed.

The present invention may alternately comprise a second embodiment with a housing having an upwardly curved spring with an attached rod; the rod is displaced downwardly when weight is connected thereto. If the weight exceeds a specific amount, then the upwardly curved spring curves downward and makes a snapping sound when the spring strikes a part of the housing in which it is contained. In this manner, the scale can be used to create an audio alert for a user if a specific weight has been exceeded. An identification card can be inserted between the spring and the housing in order to identify the owner of the suitcase to which it is attached, or the identification card can be attached on the outside of the housing.

The present invention may alternately comprise a third embodiment (entitled TagScale) which may comprise a spring, a strap, a front housing, a rear housing, a pointer, and an identification card. The advantage of this particular embodiment is that it is smaller in all dimensions, uses less material, and has fewer parts than the first embodiment.

The third embodiment is designed so that it can use a novel combination of a spring and strap in a single injection molded part. The geometry of the spring is designed in such a way as to accurately move the pointer and pointer pusher between positions in relation to the weight of the luggage being weighed. The spring is connected to the housing. The identification card is preferably located between the housing and the spring.

The spring in this particular embodiment is comprised of a vertical central spine and at least one rib on each side of the spring that connects to the spring spine. The ribs are connected at their outside ends along each side by a connection bar. The connection bar has grooves that run down its center on both front and back sides, and mate with the connection rails that are part of the front and rear housing. At the top of the spring is a pointer pusher that extends from the spine of the spring towards the pointer dial. The pointer pusher pushes the pointer when the spring is compressed. At its bottom, the spring is connected to the strap, and preferably, the spring and strap are both made out of a single piece of strong, flexible plastic, such as nylon. The strap is attached to the spring at its upper end, and is used to secure the scale to a piece of luggage to the scale. Alternatively, the spring may be a non-plastic material such as steel, and may be attached to the strap by co-molding, or by bonding, or by other fastening means.

The pointer indicates the weight of an object secured to the scale by pointing at the indicia (arranged in an arcuate configuration) along the side of the scale front housing opposite the pointer pivot. The pointer has a dial at one end with a hub in the center of the dial through which the axle passes from either the front or rear housing. The pointer is manually able to be reset by the user by turning the dial, and is moved by the pointer pusher when the spring is compressed by a suitcase being weighed. The hub of the pointer fits snugly with the axle in the housing so that friction between the hub and the axle prevents the pointer from moving when the spring returns to its uncompressed position. Other returning means such as springs or the like may be employed. The pointer is preferably made out of a rigid material such as polycarbonate plastic. The identification card is inserted into the TagScale through a slot in its upper side, and resides between the spring and the rear housing.

In another embodiment the pointer may pivot from the bottom center of the scale, and is able to be moved via a rack and pinion gear. The spine of the spring creates the rack, and the pointer is moved by the pinion gear in a manner that is commonly employed on other mechanical luggage scales.

The present invention holds significant improvements and serves as an identification tag with a portable luggage scale. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, luggage scale and identification tag system, constructed and operative according to the teachings of the present invention.

The various embodiments of the present invention will hereinafter be described in conjunction with the appended drawings, wherein like designations denote like elements.

DETAILED DESCRIPTION

The present invention is directed to a luggage scale and identification tag system as used to promote efficiency and convenience in travel. Various embodiments of the present invention are disclosed subsequently herein.

A luggage scale and identification tag system is generally described herein as comprising: a luggage scale and identification tag assembly having a housing with a hollow interior cavity, at least one upper side, a lower side, and a front side, a scale mechanism substantially contained within confines of the hollow interior cavity of the housing, a cord connected to the scale mechanism near the lower side of the housing, and a weight display. As such the luggage scale and identification tag system comprises the luggage scale and identification tag assembly. The luggage scale and identification tag assembly comprises the housing, the scale mechanism, the cord, and the weight display in functional combination.

The housing comprises the hollow interior cavity; the parameters of the hollow interior cavity are defined exteriorly by the at least one upper side, the lower side, and the front side. The scale mechanism is able to sense a weight of luggage attached to the cord during a 'weigh-in-period', such as at an airport while waiting in line. The weight display provides a visual means whereby a user is able to readily determine the weight (mass) of the luggage held by the cord, and as such the luggage scale and identification tag system allows the user to weigh the luggage in a remote location (such as an airport, bus station, train station or other similar venue) to readily determine the weight of the luggage. This feature is very useful for travelers of all kinds.

Figure 2:
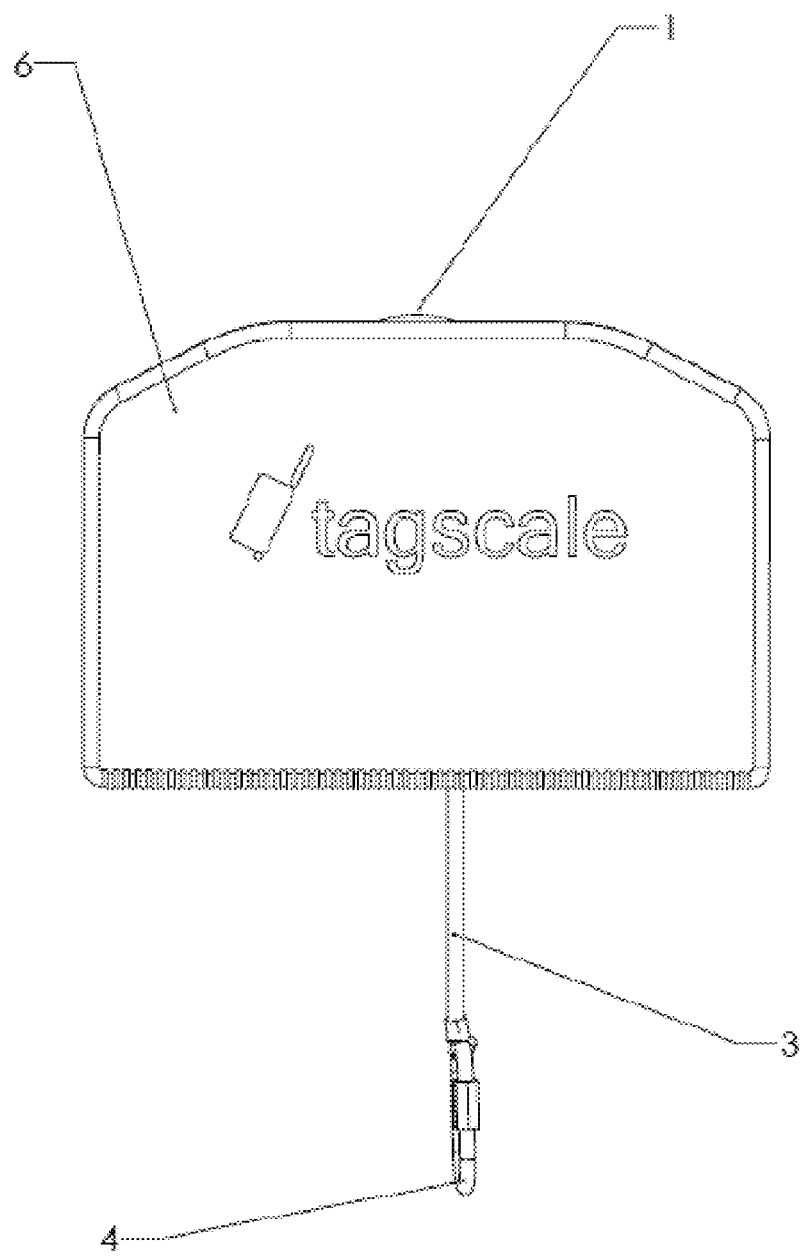
FIG. 2 is a rear view illustrating a housing with a cord and attached clasp according to a first embodiment of the present invention.
Figure 3:
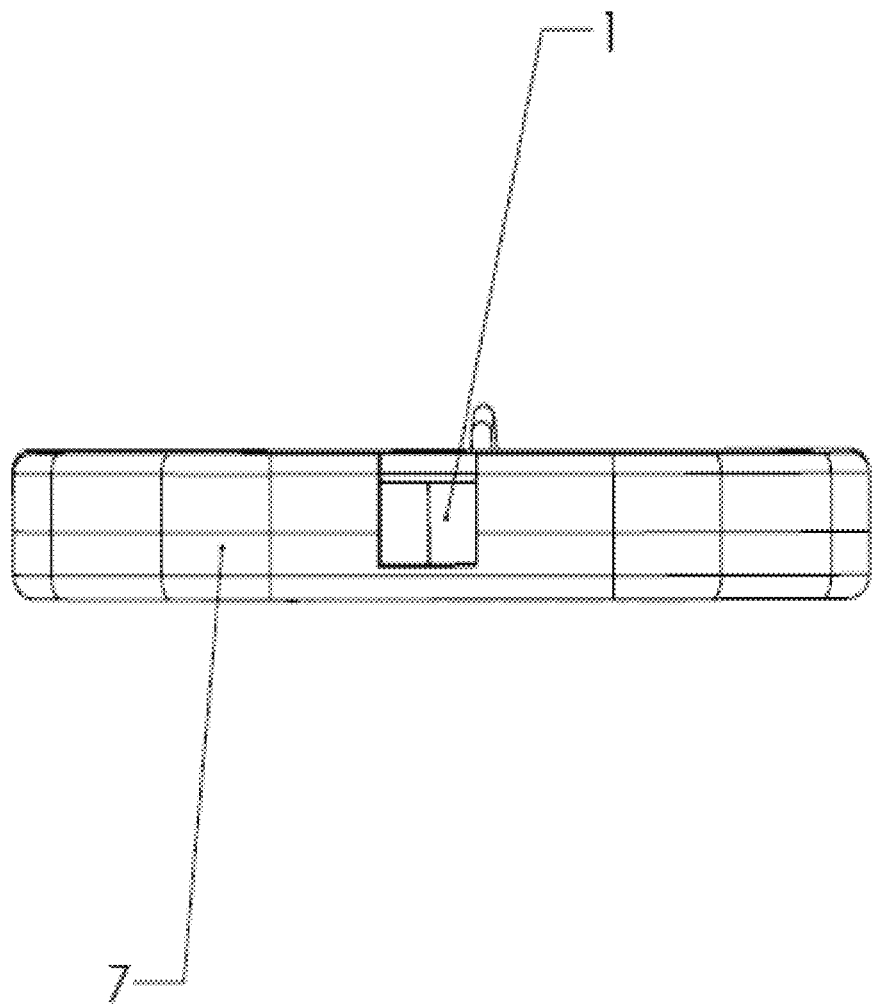
FIG. 3 is a top view illustrating a viewport in relation to the housing according to a first embodiment of the present invention.
Figure 4:
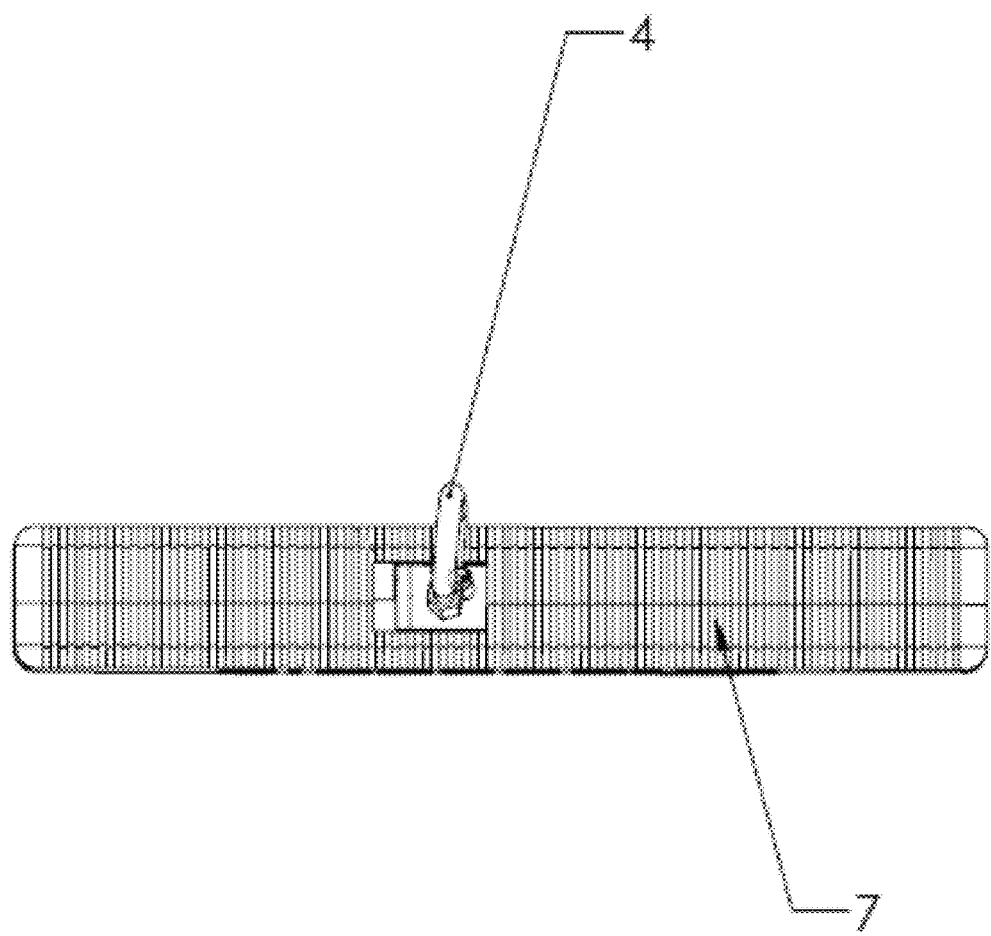
FIG. 4 is a bottom view illustrating the clasp and a grip portion of the housing according to a first embodiment of the present invention.
Figure 5:
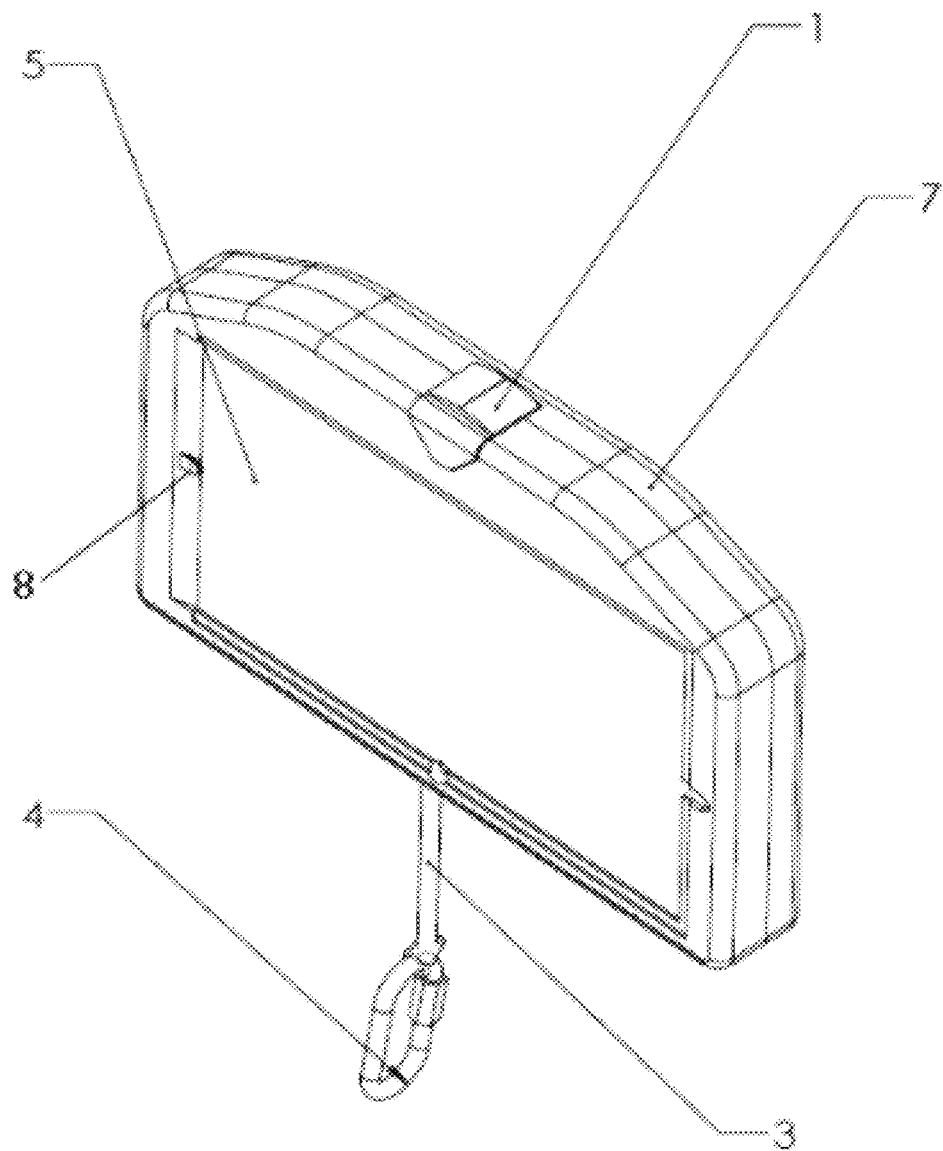
FIG. 5 is a front perspective view illustrating the luggage scale and identification tag according to a first embodiment of the present invention.
Figure 6:
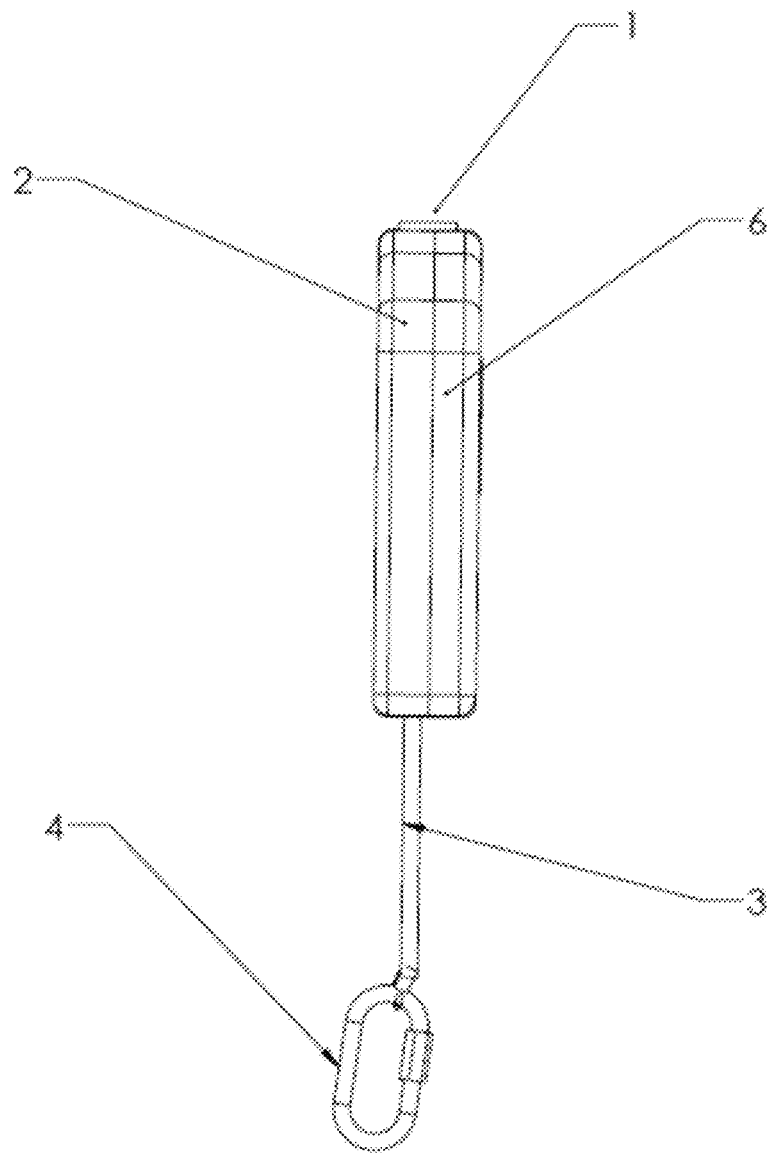
FIG. 6 shows a side view illustrating the luggage scale and identification tag according to a first embodiment of the present invention.
Figure 7:
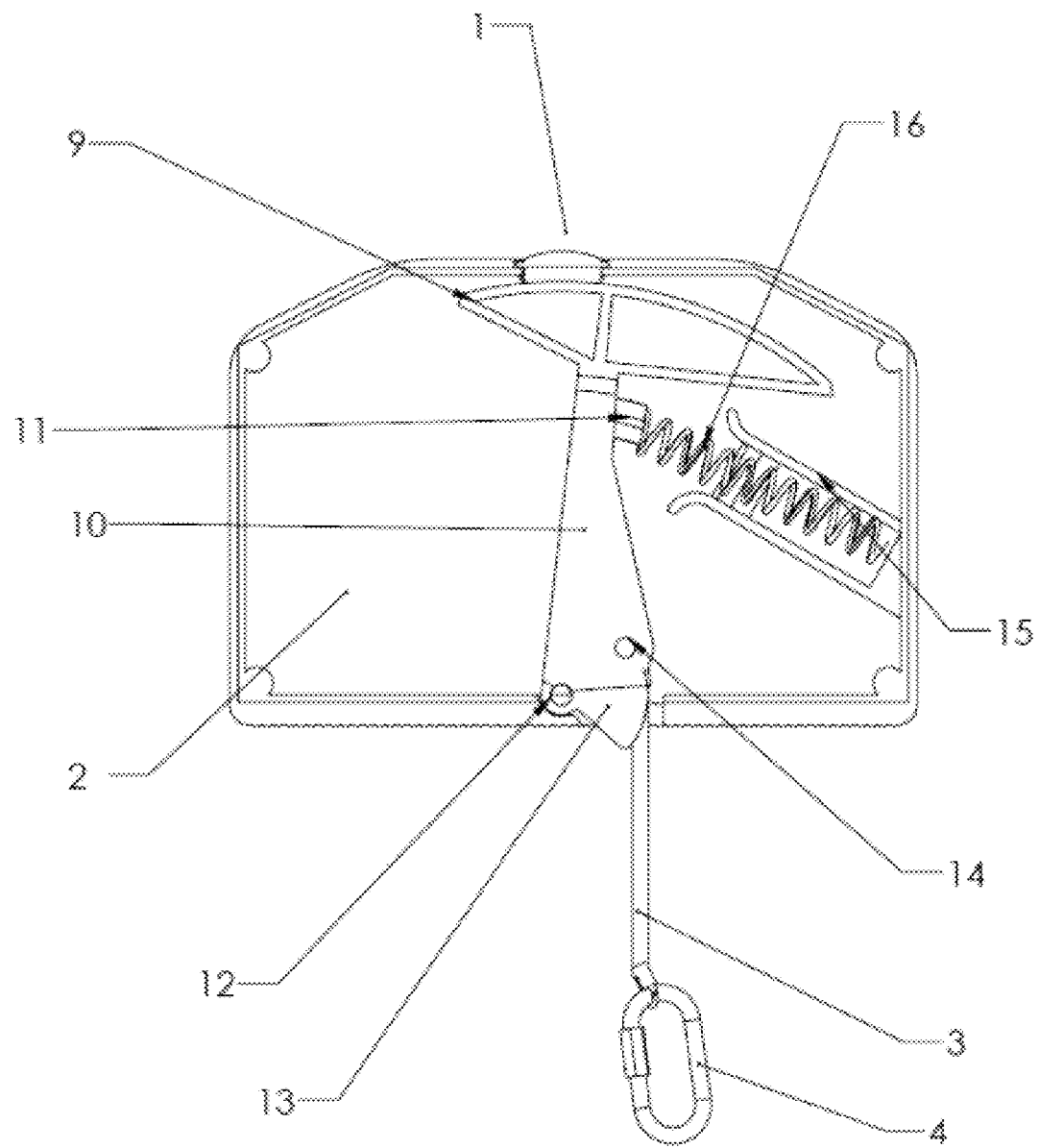
FIG. 7 is a front view (with a front housing not connected) illustrating an inner volume of the housing having a spring as connected to a bell crank with a weight indicator; the bell crank coupled to a cord and a clasp, the functional combination according to a first embodiment of the present invention.
Figure 8:
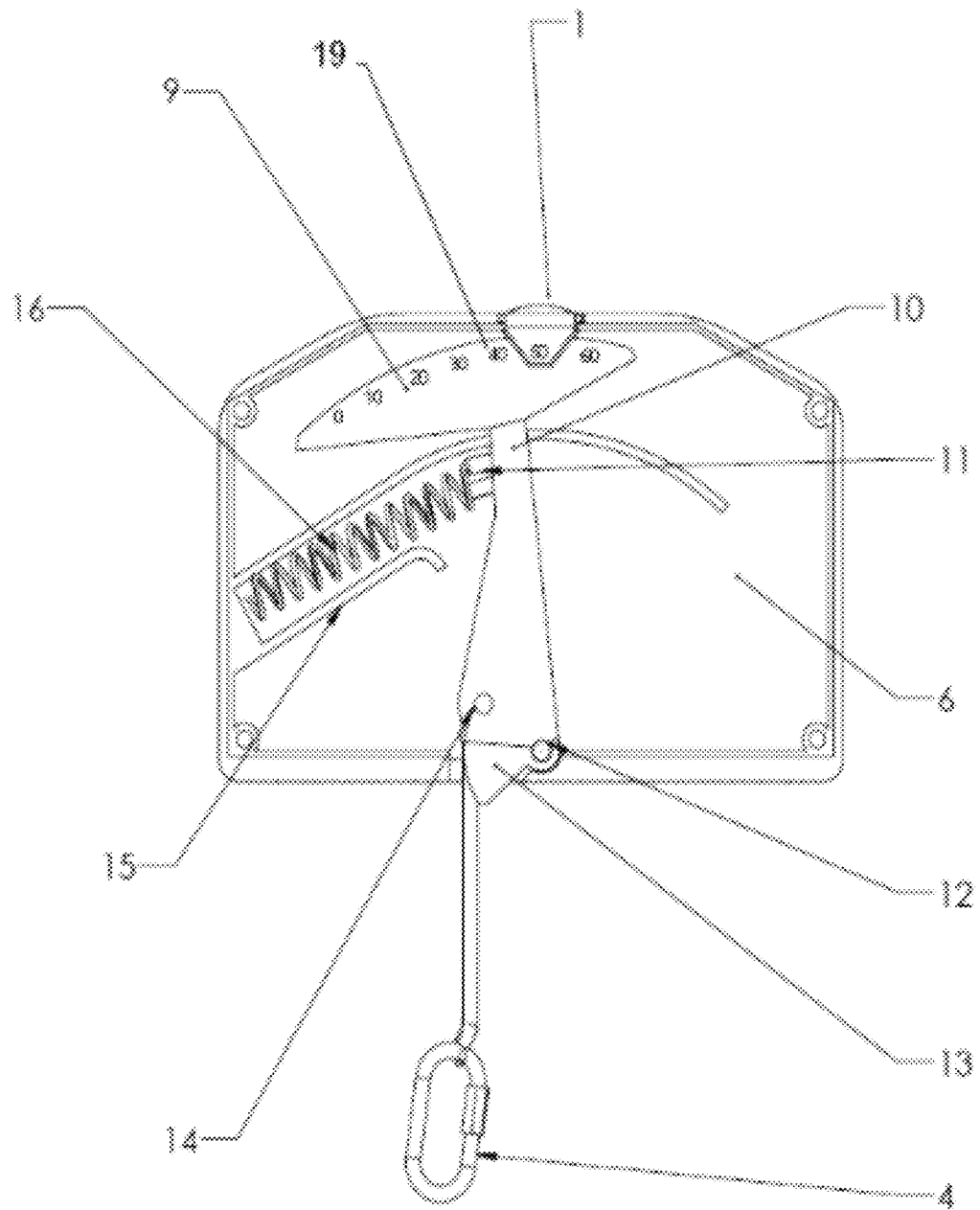
FIG. 8 is a rear view (with a rear housing not connected) illustrating the luggage scale and identification tag according to a first embodiment of the present invention.
Figure 15:
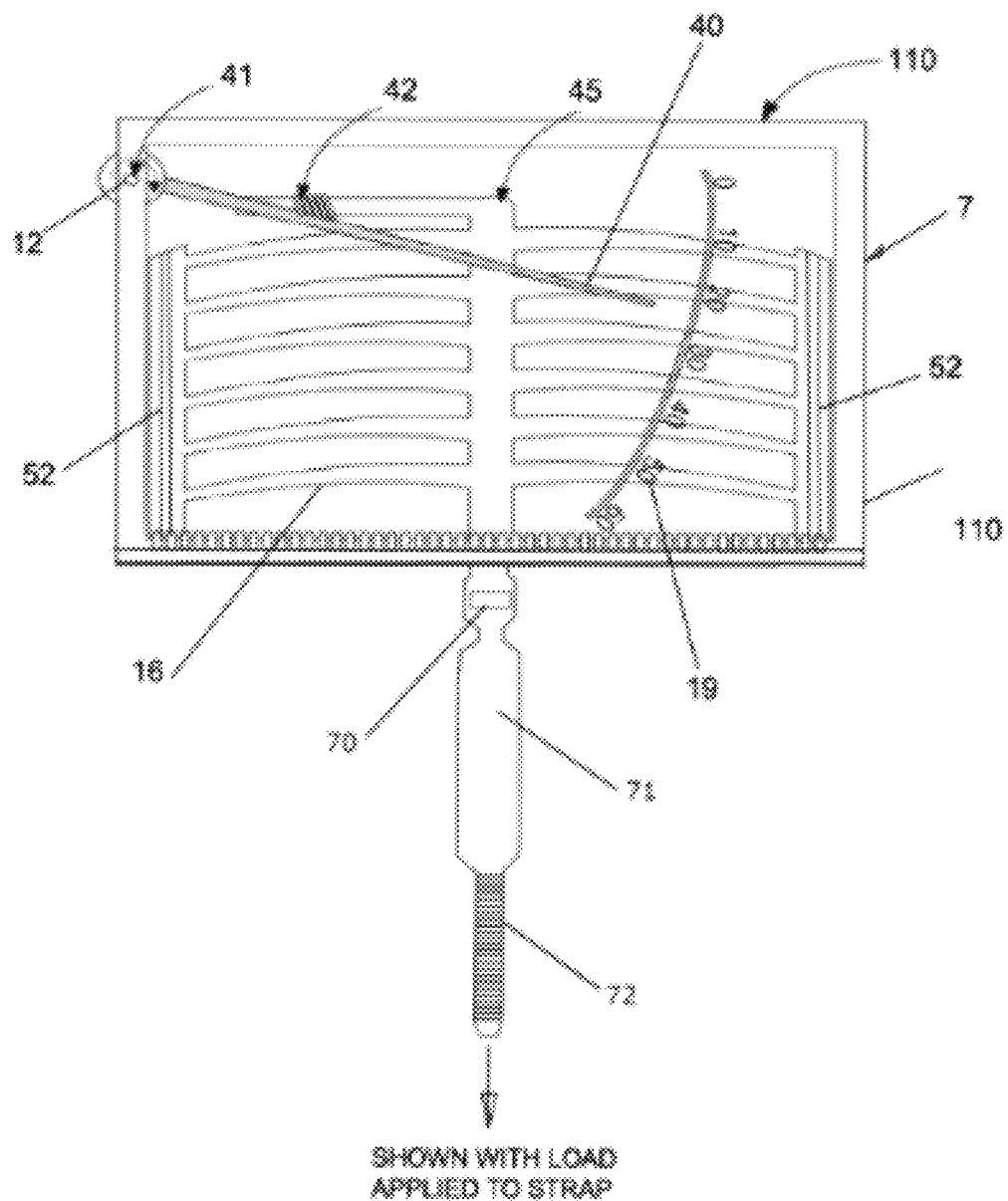
FIG. 15 is a front perspective view illustrating the luggage scale and identification tag in a loaded condition according to a third embodiment of the present invention.
Figure 17:
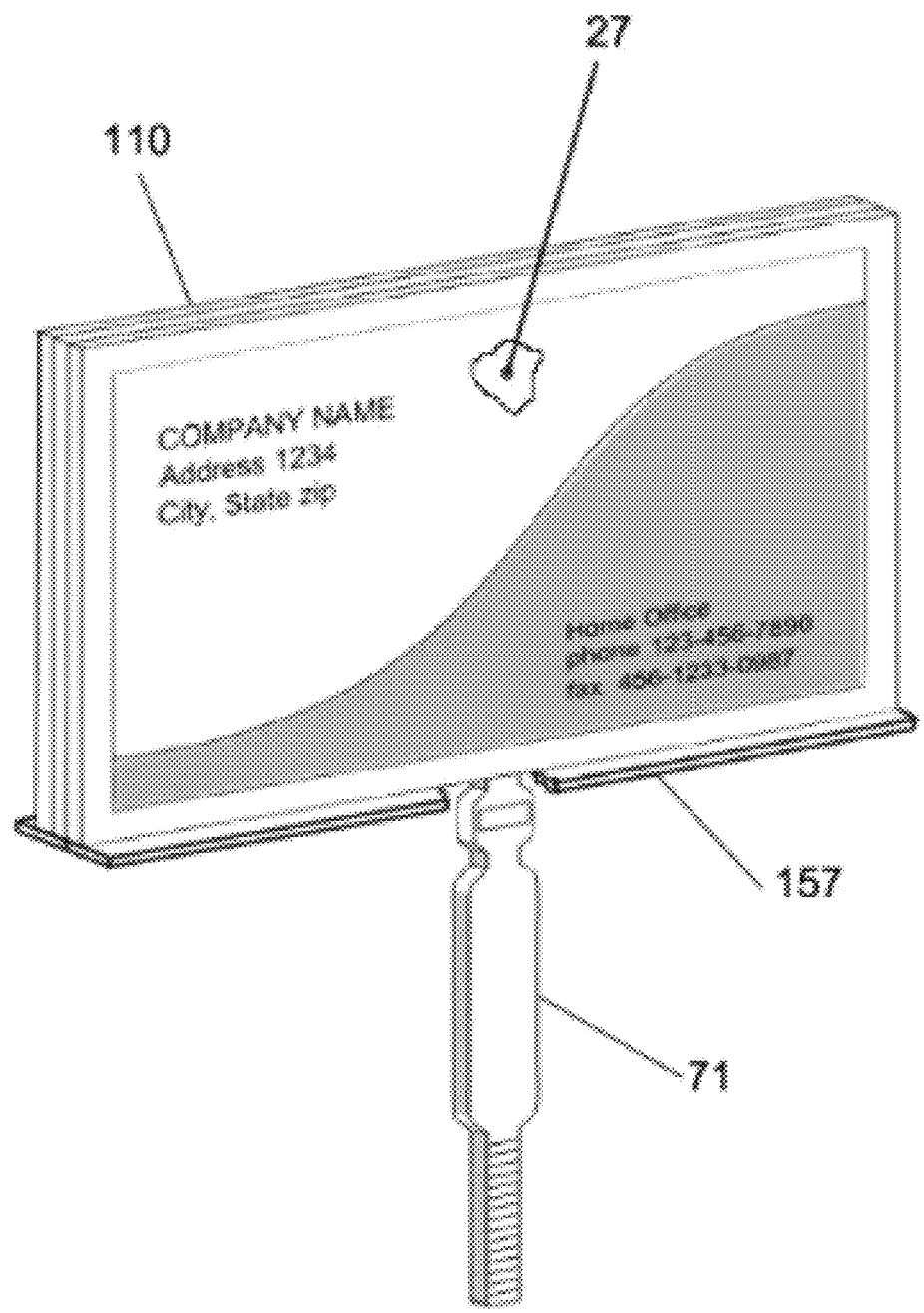
FIG. 17 is a rear perspective view illustrating the luggage scale and identification tag with a card located in an identification recess according to a third embodiment of the present invention.

The scale mechanism in certain embodiments includes at least one spring constrained by at least one curved guide subsequently shown and discussed in FIG. 8. The cord may comprise a spring and tie strap combination, as in FIG. 15. In most embodiments the front side of the housing is transparent in order to allow viewing of an identification tag, as shown in FIGS. 2 & 17; the identification tag is removable from an identification tag compartment. The weight display may include a magnifying lens such that persons with poor vision are better able to readily view the indicia.

Other embodiments may comprise a novel spring and tie strap combination. The spring and tie strap combination once separated (cut or the like) renders the luggage scale and identification tag assembly unusable for future weighing (a deterrent against theft); spring and tie strap combination shown in FIG. 19; wherein the spring and tie strap combination comprises a flexible locking cable tie (such as those sold under the tradename ZIPTIE®).

FIGS. 18-21 and 24 show the scale mechanism including a spine located near its center with ribs on either side that are attached to the housing of the luggage scale and identification tag assembly; in these embodiments the scale mechanism comprises a bell crank that is connected to the cord for providing an analog display of weight, as shown. The luggage scale and identification tag system may comprise certain embodiments such that the luggage scale and identification tag assembly is able to emit an audible signal when a pre-determined-weight has been (met or) exceeded, as in FIG. 12. This audible signal may comprise a click sound or the like. In analog versions the weight display comprises a pointer (needle) (shown in FIG. 22). The front side of the housing preferably comprises indicia useful to make a ready visual determination of the weight of the luggage held by the cord.

The weight display may comprise a rotating pointer with a pivot for the rotating pointer located near a top of the housing or the pivot may be located elsewhere relative to the housing. The ribbed deformation member versions of the luggage scale and identification tag system consists of a centrally located vertical spine with a plurality of ribs connected to the spine and to the housing of the luggage scale. In these particular embodiments the spine of the ribbed deformation member is attached to a tie strap at its lower end; wherein the tie strap is releasable. The deformation of the ribbed deformation member causes rotation of a pointer for providing indication means.

Figure 16:
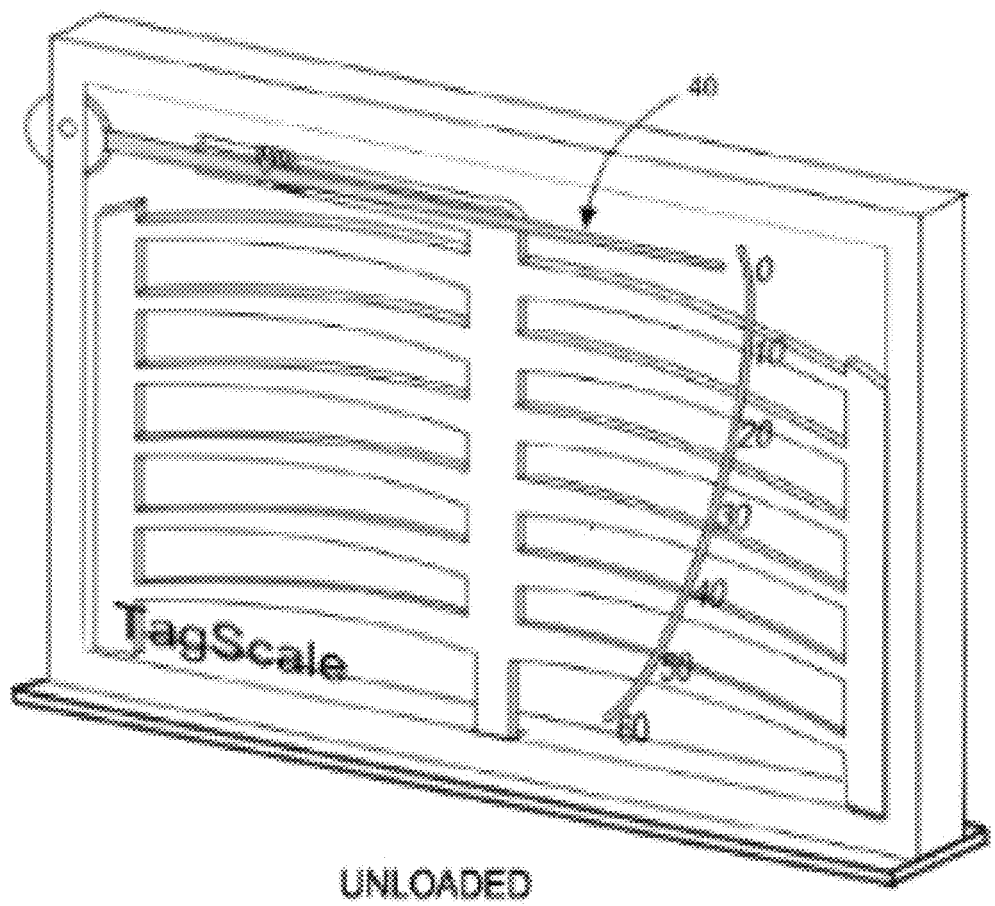
FIG. 16 shows the lower side of the housing comprising a flange.

FIG. 16 shows the lower side of the housing comprises a flange to increase surface area contact on a hand of the user whereby downward force is dispersed into hand via the flange to minimize discomfort during the weigh-in-period. In this way the present invention is made user-friendly and provides a measure of comfort to users.

Referring now more specifically to the drawings by numerals of reference there is shown in FIGS. 1-9, various views of a first embodiment of the present invention, luggage scale and identification tag assembly 110 of luggage scale and identification tag system 100.

Figure 1:
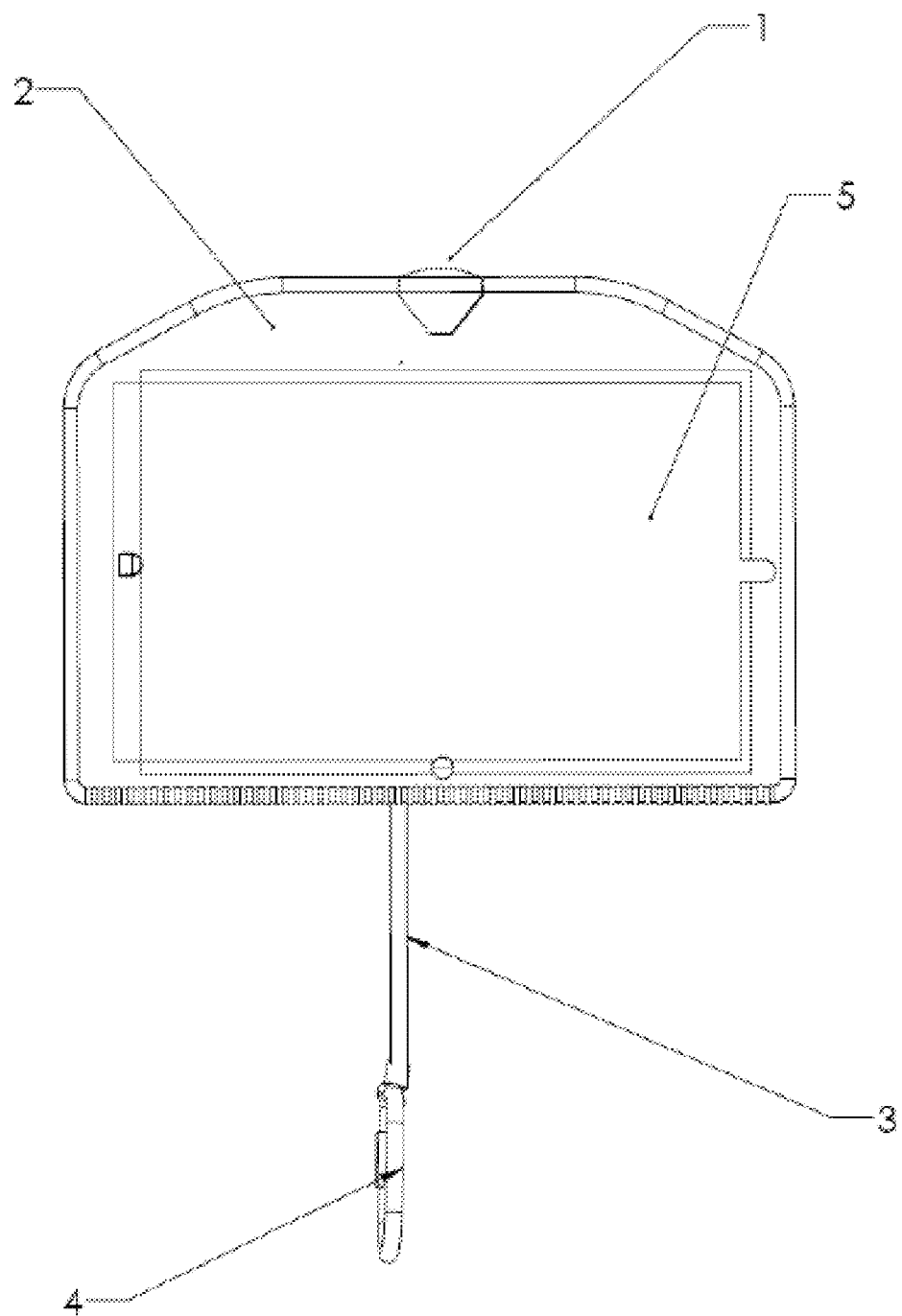
FIG. 1 shows a front view illustrating a luggage scale and identification tag of the luggage scale and identification tag system according to a first embodiment of the present invention.

Beginning in FIG. 1, viewport 1 of luggage scale and identification tag assembly 110 is shown in this particular embodiment to be located near the top of the housing, and allows the user to view the weight displayed on weight indicator 9. Weight displayed in this present invention is via analog means. Viewport 1 may comprise a clear piece of plastic that is shaped to provide magnification (if desired) of indicia 19 printed on weight indicator 9. Alternatively, housing 7 may be transparent in the area of viewport 1, or entirely transparent, or may comprise a hole in housing 7. Viewport 1 may extend from the top of housing 7 to the front or rear side of housing 7 in order to provide the capability of reading the weight from the front or rear of the present invention. Preferably, viewport 1 is made out of a transparent injection molded plastic such as acrylic or polycarbonate or styrene. Other suitably equivalent materials may be used in alternate embodiments.

Figure 9:
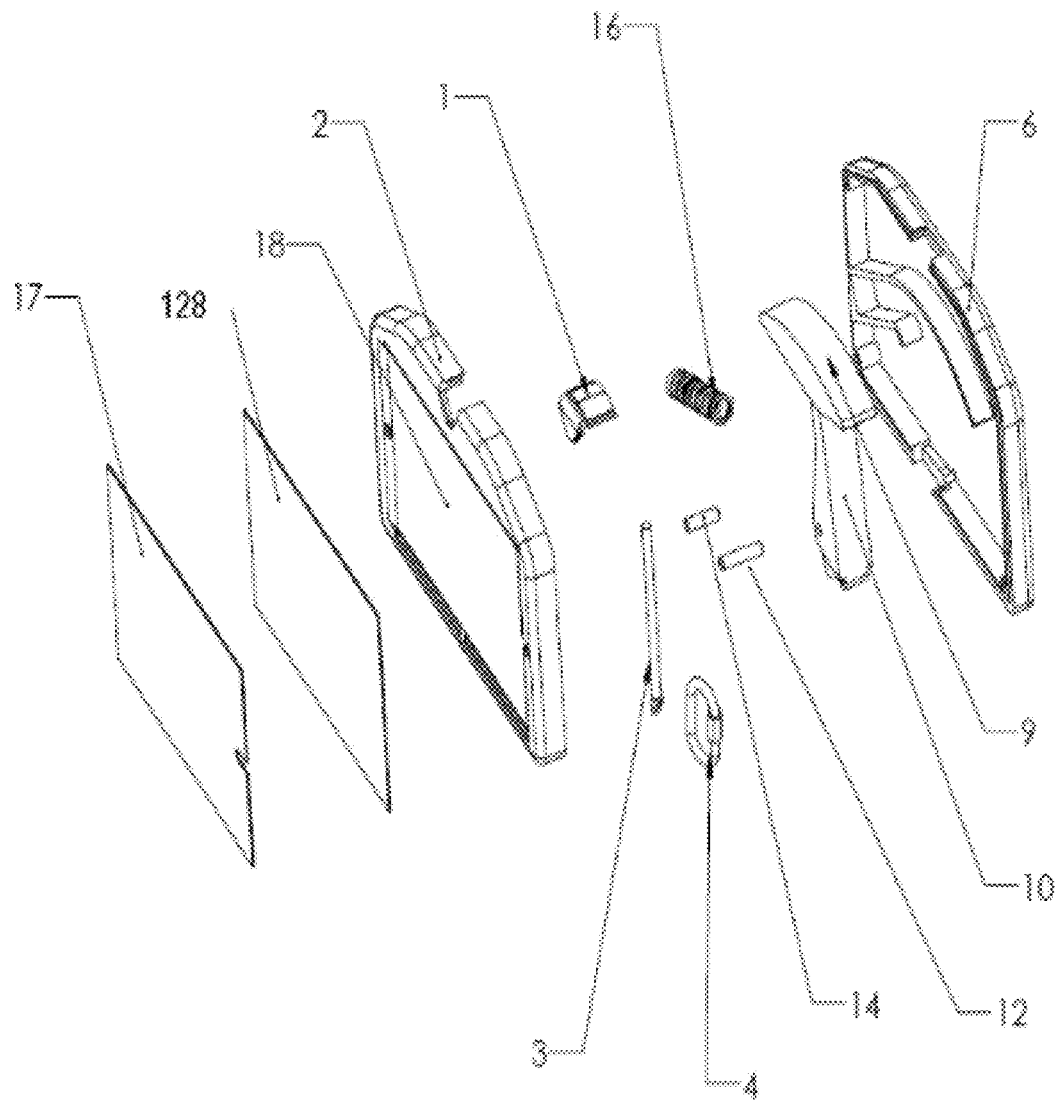
FIG. 9 is an exploded view illustrating the front housing, rear housing and various components of the luggage scale and identification tag according to a first embodiment of the present invention.

Front housing 2 may be attached to rear housing 6 around its perimeter with screws, or glue, or ultrasonic welding, or press fit bosses, or other connection means of sufficient strength. FIG. 9 shows an exploded view of the described relationship between front housing 2 and rear housing 6 as well as how the various components structurally and functionally cooperate in combination as the present invention. The cavity formed between front housing 2 and rear housing 6 houses the weight measurement mechanism of the scale, which may in alternate embodiments include bell crank 10, and spring 16, as shown. A blind hole is located on (and normal to) the lower rear face of front housing 2 and holds axle 12. Spring guides 15 are integrally molded with front housing 2, and preferably comprises two parallel walls perpendicular to the front face of front housing 2 that are separated by a distance that is large enough to contain spring 16. Front housing 2 is preferably constructed out of a tough injection moldable material such as ABS, but may also be constructed out of a variety of other rigid materials. Front housing 2 may be constructed with a clear plastic to allow viewport 1 to be integrally molded with front housing 2.

Cord 3 connects cord connector 14 with clasp 4, and must be of sufficient strength to support the weight of the luggage being weighed with the present invention. Cord 3 is preferably constructed out of a strong, flexible material, such as woven nylon. Cord 3 can be connected to cord connector 14 and clasp 4 by wrapping cord 3 into small loops at its ends, and then sewing through the ends of cord 3 with a strong thread. The ends of cord 3 may alternatively be fastened using glue, or by heat welding, or with other means commonly employed to fasten the ends of a cord into loops.

Clasp 4 is attached to cord 3, and is used to attach the end of cord 3 to a middle portion of cord 3 after clasp 4 has been passed through a suitcase handle. Clasp 4 (or other suitable fastener) may open and close reasonably easily such as use of a carabiner or key ring, but may also be more difficult to open and close such as a padlock (in order to prevent theft of the present invention). Clasp 4 is preferably made out of a suitably strong material such as aluminum, steel, or a strong molded plastic material such as nylon to provide durability and longevity in use.

Referring now to identification holder 5 comprising a space on the front side of front housing 2 that can hold identification card 128 such as a business card, as shown in FIG. 17, or a hand written identification tag. In the preferred embodiment, identification holder 5 comprises recess 18 in the front side of front housing 2 that is substantially rectangular in shape, and is preferably slightly larger in size than the dimensions of a business card. Recess 18 is preferably covered by transparent window 17 that is attached to front housing 2 along three sides of its perimeter by adhesive, or ultrasonic welding, or by other means. The unattached side of identification holder 5 is used for insertion and removal of identification card 128 into the space between recess 18 and transparent window 17. In an alternative embodiment of the invention, identification holder 5 may have a writing surface with dimensions approximately matching those of identification card 128 or business card, and can be directly mounted to or part of its surface; transparent window 17 may be omitted from the invention assembly in certain embodiments in order to allow the user to write directly on the exposed writing surface.

As previously mentioned, rear housing 6 may be attached to front housing 2 around its perimeter with screws, or glue, or ultrasonic welding, or press fit bosses, or other means providing sufficient strength. As such housing 7 comprises a hollow compartment including front housing 2 and rear housing 6, which are connected together. The cavity formed between front housing 2 and rear housing 6 houses the weight measurement mechanism of the scale, which may include bell crank 10, and spring 16. A blind hole is located on and normal to the lower front face of rear housing 6 and holds (supports and provides mounting for) axle 12. Another hole passes through the bottom surface of rear housing 6 and allows cord 3 to pass through housing 7. Spring guide 15 in these particular embodiments may be integrally molded with rear housing 6, and consists of two partially parallel walls perpendicular to the front face of rear housing 6 which are separated by a distance that is large enough to contain spring 16. A curved portion of spring guide 15 controls the movement of spring 16 as spring support 11 moves in an arc when the scale is in use. Rear housing 6 is preferably constructed out of a 'tough' injection moldable material such as ABS (plastic), but may also be constructed out of a variety of other rigid materials. Rear housing 6 may be clear to allow viewport 1 to be integrally molded with rear housing 6 in this particular embodiment.

Referring now to bump 8; bump 8 comprises a small protrusion located near the center of the open edge of identification holder 5. Bump 8 is used to prevent identification card 128 from inadvertently sliding out of recess 18 as a result of vibration or shaking as is often experienced during travel. Bump 8 is small enough to allow identification card 128 to pass between window 17 and bump 8 when sufficient force is applied to the opposite side of identification card 128 for example with a pen or similar sized object. Bump 8 provides a gripping means to 'friction-hold' identification card 128 for display.

Weight indicator 9 in this particular embodiment is the portion of bell crank 10 located at the end opposite its fulcrum. Weight indicator 9 has indicia 19 printed on the cylindrical convex surface of weight indicator 9 that faces viewport 1. Indicia 19 is/are used to indicate the mass (commonly referred to as 'the weight'; the mass in lbs or kg) of an item that is being weighed with the present invention. Weight indicator 9 also has indicia 19 printed on its front facing planer face so that indicia 19 is/are visible through the front side of viewport 1. Indicia 19 on weight indicator 9 may also be color coded so that certain weight ranges appear in different colors from other weight ranges. The color coding makes it easier to see if a suitcase is over a weight limit that has been set by the airlines. In an alternate embodiment, weight indicator 9 comprises pointer 40 instead of a convex surface, and indicia 19 are printed on transparent housing 7 (shown in subsequent drawings).

Bell crank 10 is connected to housing 7 by axle 12 located at its fulcrum. Bell crank 10 is connected to cord 3 by cord connector 14. Near the end of bell crank 10 (closest to its fulcrum) is an arc shaped portion of bell crank 10 that helps to keep cord 3 in contact with bell crank 10 at a constant horizontal distance when the invention is in use. This feature reduces the sensitivity of the scale to weight error that might be caused when the scale is not level during its use. Bell crank 10 has weight indicator 9 located at its end opposite to its fulcrum. Spring support 11 is located on bell crank 10 between weight indicator 9 and the hole for axle 12. Spring support 11 is oriented to face towards the centerline of spring guide 15. Bell crank 10 passes over spring guide 15 so bell crank 10 is preferably thinner in the area where it crosses spring guide 15 such that spring guide 15 can be of adequate thickness to guide spring 16. Bell crank 10 is preferably constructed out of a 'tough' injection moldable material such as ABS (plastic), but may also be constructed out of a variety of other rigid materials.

Spring support 11 may be a portion of bell crank 10, in certain embodiments, which is used to hold the end of spring 16 in a fixed location on bell crank 10. Spring 16 is located below weight indicator 9, and is sized to fit inside of spring 16.

Axle 12 is used to rotationally support bell crank 10 at its fulcrum, and is trapped between blind holes in front housing 2 and rear housing 6. Axle 12 is preferably made out of steel, but may also be made out of other suitably strong rigid materials such as aluminum or plastic. Cord guide 13 is a part of bell crank 10 that is used to prevent cord 3 from becoming trapped between housing 7 and bell crank 10. Cord guide 13 consists of two flanges that protrude from the front and rear side of bell crank 10 just past the surface on which cord 3 travels.

Cord connector 14 may comprise a pin connected to bell crank 10, around which the end of cord 3 is wrapped. Cord connector 14 is preferably made out of steel, and is press-fit or co-molded into bell crank 10 near the fulcrum of bell crank 10. Cord guide 13 is a part of front housing 2 and rear housing 6 that is used to hold and guide spring 16. Spring guide 15 is preferably made out of ABS plastic.

Spring 16 comprises a compression spring that provides a resistance force to rotational motion of bell crank 10. Spring 16 is connected to bell crank 10 at spring support 11, and is restrained within housing 7 by spring guide 15. Spring 16 is preferably made out of steel, but may also be made out of other commonly used spring materials. In an alternate embodiment, more than one spring 16 can be used instead of a single spring 16, and more than one spring guide 15 and spring support 11 can be used in luggage scale and identification tag assembly 110 instead of a single spring guide 15 and spring support 11.

Referring now again to window 17; window 17 is used to hold and protect identification card 128 (such as a business card) against the outside surface of front housing 2. Window 17 is able to be attached during manufacture to front housing 2 along its top side, bottom side, and one other side using adhesive, ultrasonic welding, or other fastening means.

One end of window 17 has a slot in it near its center. The slot allows the user to insert a pen point near the edge of identification card 128, and push identification card 128 out of the identification holder 5 when identification card 128 needs to be updated or replaced. Window 17 is preferably constructed using a clear or tinted transparent plastic such as acrylic, ABS or polycarbonate, but may also be constructed using translucent or opaque plastics in alternate embodiments.

Figure 10:
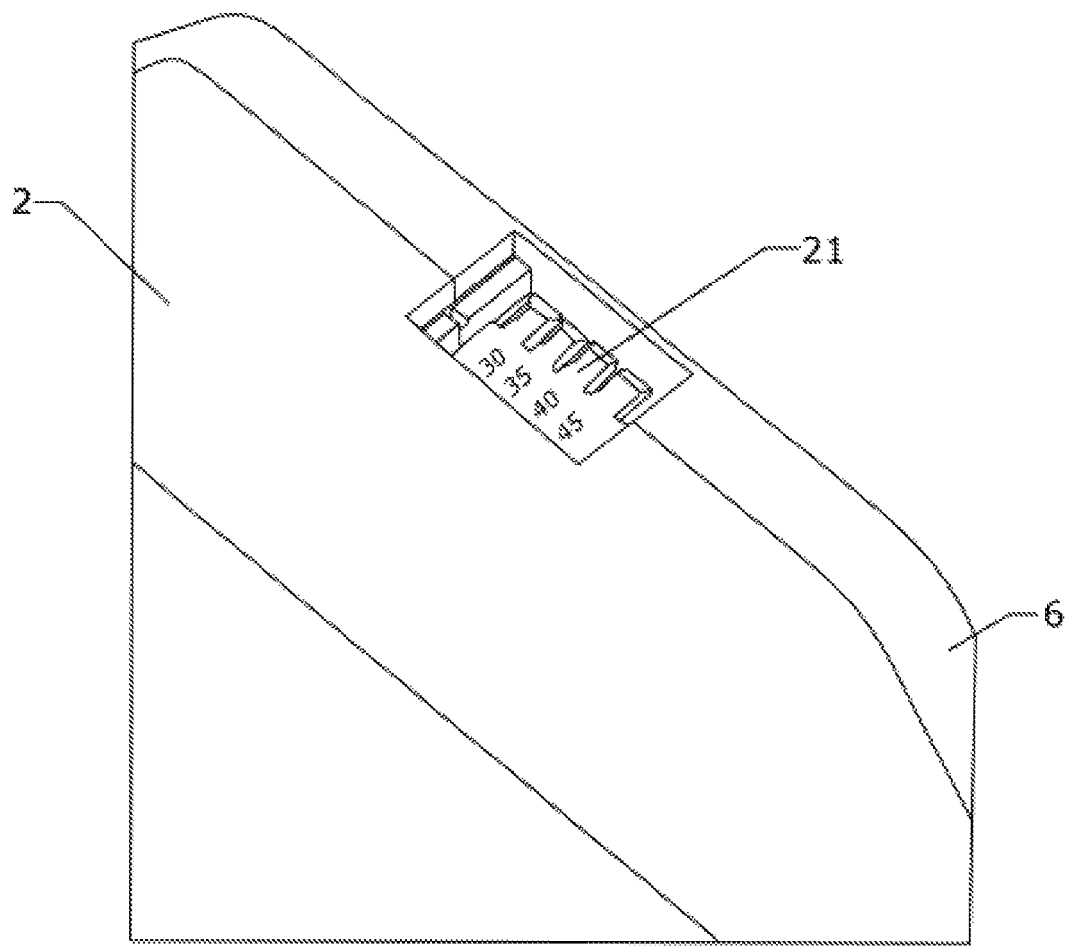
FIG. 10 is a perspective top view illustrating weight indicia used on the luggage scale and identification tag (with magnifying lens not shown).

The (identification) recess 18 preferably comprises a recessed area in the outer front surface of front housing 2 that is sized and shaped to hold identification card 128 (such as a business card). Recess 18 has a depth approximately equal to the thickness of identification card 128 (plus the thickness of window 17) so that the outside surface of window 17 is flush to the front surface of front housing 2. Recess 18 preferably has a slot at one end that aligns with the slot located at the edge of window 17. The slot allows a pen or pencil tip to be inserted for pushing identification card 128 out of identification holder 5. At the opposite end of recess 18 is a ramp surface that acts to push the edge of identification card 128 out of recess 18 when a pen (or other device that can fit into the slot) is used to push on the opposite side of the identification card. Near the center of the ramp surface is a small bump 8 that prevents identification card 128 from inadvertently sliding out of recess 18 as a result of vibration or shaking. FIG. 10 shows a perspective view illustrating slots 21 used on luggage scale and identification tag assembly 110 (with magnifying lens not shown).

Indicia 19 are generally numerical markings located on the upper surface of weight indicator 9 that indicate the weight of a suitcase that is attached to cord 3 and lifted off the ground. Indicia 19 are generally in pounds or kilograms, and may be color coded so that it is more easily visible to a user when the weight of a suitcase being weighed exceeds a weight limit that has been set by the airlines. Indicia 19 comprises visual indication means; alternate embodiments may comprise audible means. Indicia 19 may be printed on an adhesive label that is attached to weight indicator 9, or they may be embossed or debossed directly onto the surface of weight indicator 9. Alternately, they may be printed directly on weight indicator 9.

Referring generally to the figures; the luggage scale housing (housing 7) is generally rectangular in shape, and consists of front housing 2 (part) and rear housing 6 (part) that can be fastened together with screws, adhesive, press fit bosses, or by ultrasonic welding. The luggage scale housing (housing 7) is designed to be lifted by the grip on its bottom side, and incorporates a ribbed or non-skid surface along its bottom side to improve grip for the user, and to convey the proper method of support to the user. In the middle of the grip is an opening from which flexible cord 3 protrudes with clasp 4 on its end. Cord 3 may be easily secured to the handle of a luggage item by passing cord 3 through the handle, and connecting clasp 4 to cord 3. The present invention has been designed to be user-friendly.

Inside the luggage scale housing (housing 7) is a spring resistance scale that attaches to luggage cord 3 near the bottom of housing 7, and displays the luggage weight (visually) near the top side if the scale. The spring resistance scale is comprised of bell crank 10, which pivots on axle 12 located near the bottom of housing 7. One arm of bell crank 10 attaches to luggage cord 3 near the bottom of the scale. The other arm of bell crank 10 has weight indicator 9 at its end.

Weight indicator 9 is generally arc shaped so that its distance to viewport 1 does not change when the load on the scale changes. Weight indicator 9 may include a multi-color display that can be printed directly onto weight indicator 9, or may instead be printed onto a plastic sticker that is adhered to weight indicator 9. The multi-color display improves the ability of the user to readily determine if the luggage is over or under specific weight limits that may be set by airlines. Typically, the weight indicator display will include spaced markings with printed weights (masses) in pounds or kilograms along with one or two color breaks that indicate critical weight limits. At the top of housing 7 near its center is viewport 1, which may consist of a hole 24 with a transparent cover. The cover is marked near its center to indicate the specific location where the weight is to be read from weight indicator 9.

Viewport 1 may also be lens shaped in order to magnify the text on weight indicator 9 for easier reading. The cover may also be a part of housing 7 if housing 7 is constructed of a transparent material, such as plastic. Viewport 1 cover and bell crank 10 are shaped so that the weight of the luggage can also be read from the front side of luggage scale and identification tag assembly 110 for convenience of the user. A resistance force is applied to bell crank 10 by compression spring 16 that is constrained in spring guide 15 which is integrally molded into the rear side of front housing 2 and the front side of rear housing 6, in those particular embodiments.

Spring 16 is further constrained at one end by spring support 11 that protrudes from a side of bell crank 10, and fits inside the end of spring 16. Spring guide 15 is arc shaped in one portion in order to match the path of bell crank 10 as spring 16 is compressed. On the front side of front housing 2 is identification holder 5 that can be used to hold a paper or cardboard identification tag or business card for the user. Identification holder 5 is recessed into front housing 2, and is covered by transparent window 17 that is spaced away from recess 18 sufficiently to allow room for the identification tag between window 17 and recess 18 in front housing 2. Window 17 lies in a rectangular recess that surrounds the identification card recess and can be fastened to rectangular recess 18 along three of its four sides using adhesive, screws or ultrasonic welding.

Alternatively, front housing 2 can be made of a clear material such as plastic, and identification holder 5 recess 18 can be a separate part that is attached to front housing 2 using adhesive, screws or ultrasonic welding. The identification tag can be inserted into identification holder 5 through the open side of identification holder 5 where window 17 is not attached to front housing 2. Near the center of the open side of identification holder 5 is a small wedge shaped tab 8 that is part of identification holder 5 recess. Tab 8 is small enough to allow the identification card to be inserted into identification holder 5, but prevents the identification card from sliding out of identification holder 5 when housing 7 is subjected to vibration or shaking.

A slot is located on the side of window 17 and in front housing 2, opposite the open side of identification holder 5. The purpose of the slot is to allow a pen tip or similar sized object to be used to push the identification card out of the slot when necessary. Housing 7 may be of a size large enough to hold and display a U.S. standard business card on its front facing side. Housing 7 contains a resistive-spring based weighing mechanism, which includes a readout that may be viewed through an opening or window 17 in housing 7. Incorporated into the bottom edge of housing 7 is a grip, molded so that housing 7 can be held comfortably in one hand (certain embodiments have flange 157 for comfort enhancement). Attached to the weighing mechanism in housing 7 and hanging down through an opening in housing 7 is cord 3 which serves two purposes. The bottom of cord 3 may have clasp 4 or other suitable mechanism, which can be attached to cord 3 after cord 3 has been passed through the handle or any other loop structure attached to a luggage item. The first purpose of cord 3 is to allow the device to remain attached to the baggage while the baggage is in transit or storage. In this method of usage, the device functions as a luggage tag which by the affixed or attached business card allows the traveler to readily ascertain that the luggage item is their property when claiming baggage during or after a journey. The second purpose of cord 3 is to facilitate weighing a baggage item.

We now briefly discuss the action involved in using the device for the second purpose. With cord 3 attached to the luggage item, housing 7 is gripped in one hand and lifted vertically over the luggage item. Once the luggage item is lifted off the ground, spring 16 inside housing 7 will be compressed in relation to the weight of the luggage item. Compression of spring 16, allows movement of weight indicator 9 in relation to the weight of the luggage item, thereby displaying the weight of the luggage item inside of viewport 1.

Figure 11:
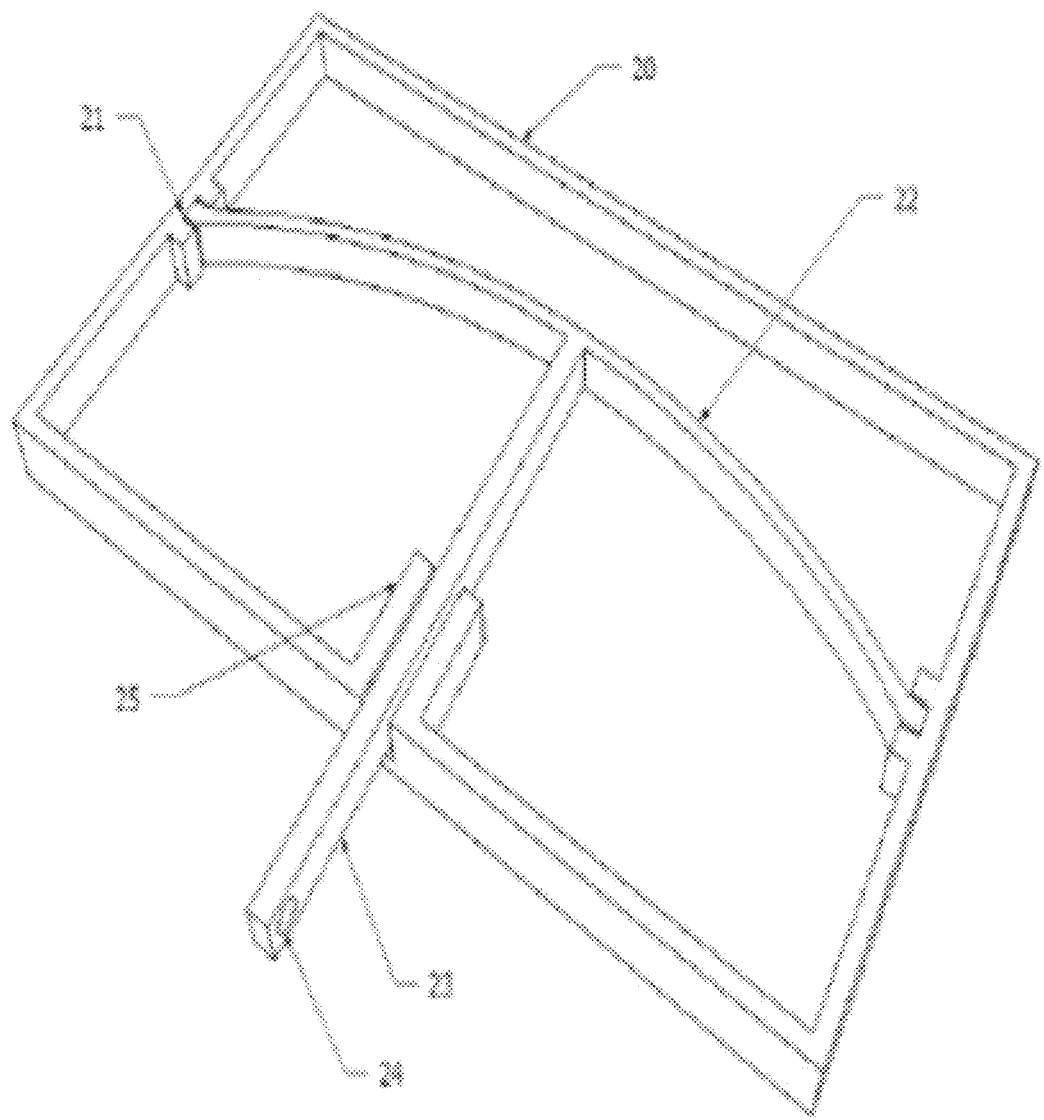
FIG. 11 is a perspective view illustrating a curved spring (shown in its unloaded position) with a rod extending from a center of the curved spring; the rod connected to a cord that runs through a hole near the end of the rod; the device used to connect to a suitcase handle for use according to a second embodiment of the present invention.
Figure 12:
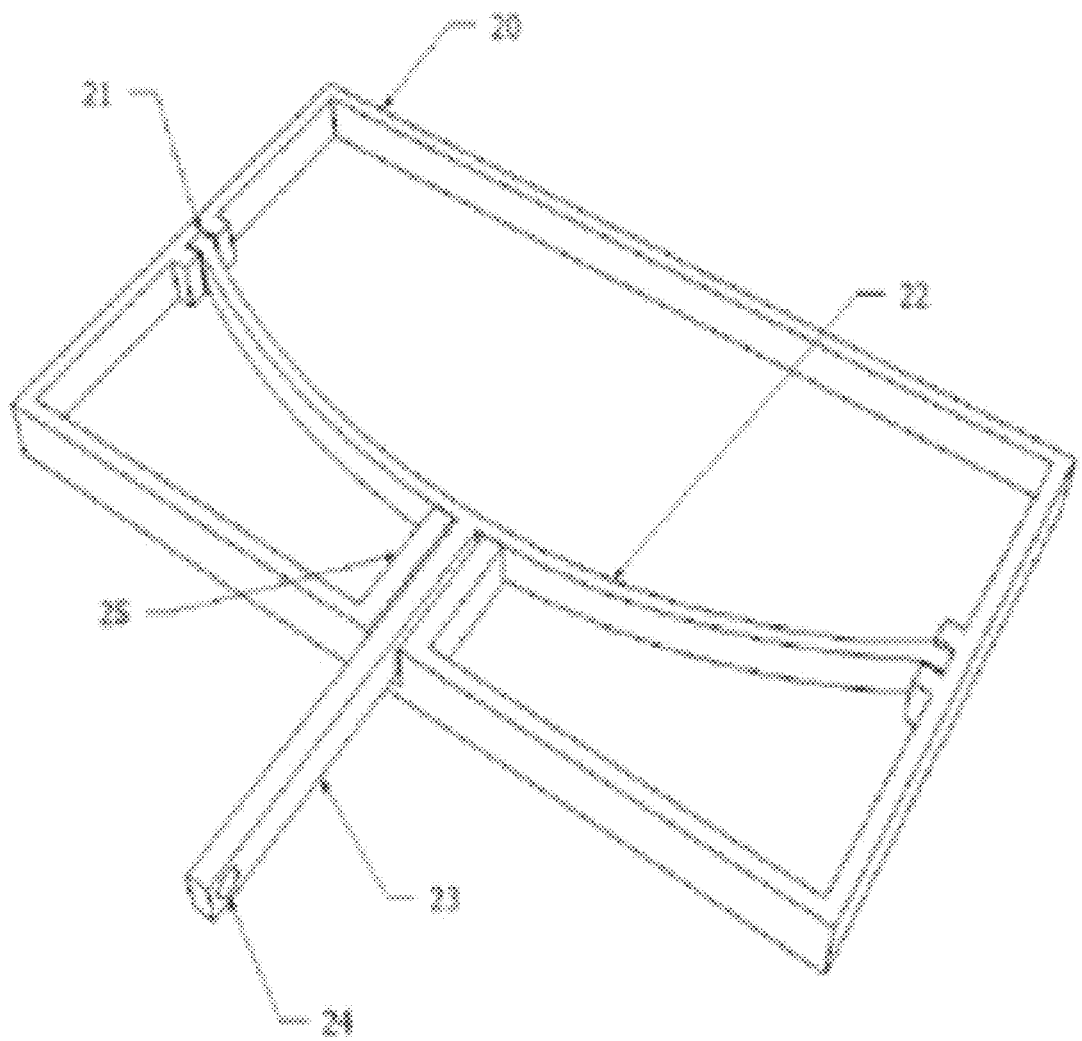
FIG. 12 is a perspective view illustrating the curved spring (shown in its loaded position to a point where a trigger weight is exceeded for the curved spring) according to a second embodiment of the present invention.
Figure 13:
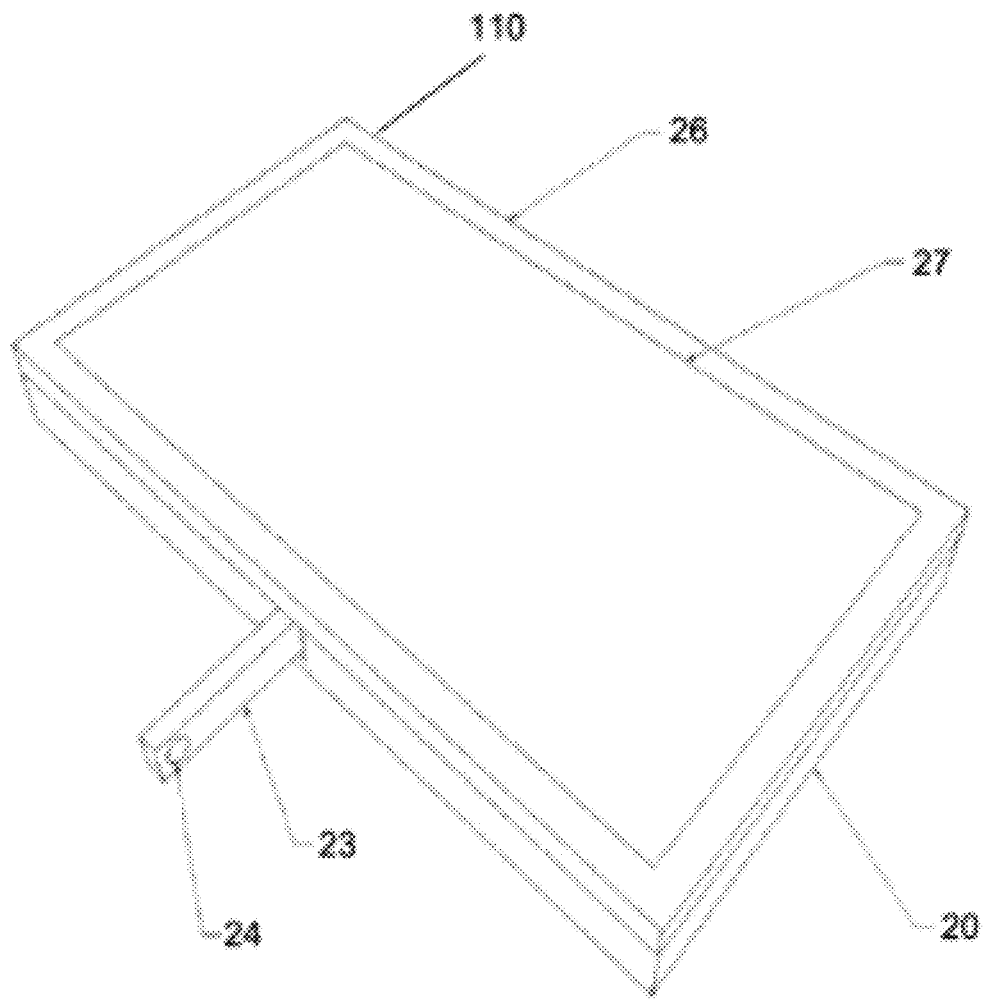
FIG. 13 is a perspective view illustrating the luggage scale and identification tag (as assembled) according to a second embodiment of the present invention.
Figure 14:
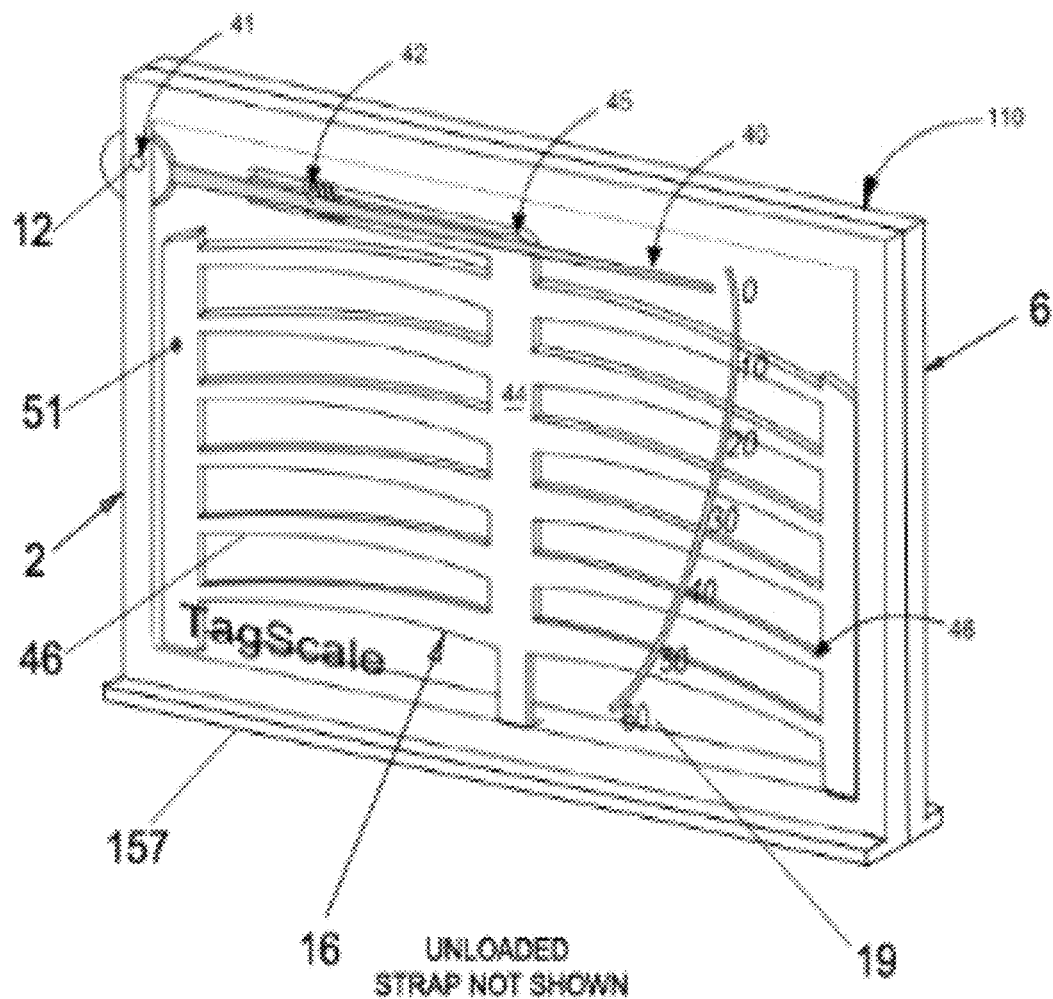
FIG. 14 is a front perspective view illustrating the luggage scale and identification tag in an unloaded condition according to a third embodiment of the present invention.

In an alternate embodiment of the invention shown in FIGS. 11-13, the invention comprises luggage scale and identification tag assembly 110 that indicates by emitting a sound if the luggage attached to the luggage scale (meets or) exceeds a single predetermined weight. This may be accomplished via a speaker. In FIG. 13, the alternate embodiment of the invention is shown fully assembled with luggage identification card 27 adhered to its outside surface. Luggage identification card 27 may be affixed to the alternate rear housing 26 with peel and stick tape, or may be permanently bonded, or alternate rear housing 26 may be shaped in a similar configuration to the (identification) recess 18 found in the preferred embodiment(s) of the invention.

Referring generally now to FIGS. 11-13 showing various views of luggage scale and identification tag assembly 110 according to a second embodiment of the present invention.

The present invention may alternately comprise a second embodiment with housing 7 having curved spring 22 with attached rod 23; rod 23 is displaced downwardly according to the weight connected thereto. Rod 23 may provide the visual indication as to the weight supported.

In this alternate embodiment the alternate rear housing 26 is removed. Curved spring 22 is supported inside of the alternate front housing 20 by two slots 21 found on either side of the alternate front housing 20. Curved spring 22 is shown in its unloaded position (FIG. 11) with its convex surface pointing upward. Rod 23 extends from a location near the center of curved spring 22, and is used to connect to a suitcase handle with cord 3 that runs through hole 24.

FIG. 12 shows the alternate embodiment of the invention with the alternate rear housing 26 removed, and with curved spring 22 deflected to a position that indicates that the trigger weight for curved spring 22 has been exceeded. Curved spring 22 pops when its trigger weight is exceeded, in a manner similar to that of an oil can when it is being compressed. Stop walls 25 prevent curved spring 22 from bending excessively, and also provide an impact surface for the lower side of curved spring 22, such that a noise is created (and emitted) when curved spring 22 impacts with stop walls 25. The bottom wall of alternate front housing 20 acts as the hand grip for the alternate embodiment of the invention.

The alternate front housing 20 is preferably rectangular in shape, as shown, and has sidewalls on the top, bottom, left and right sides. The bottom side has a hole near the center and two stop walls 25 located on either side of the hole. The alternate front housing 20 is preferably made out of plastic such as ABS, but may also be made out of other plastics or suitably equivalent rigid materials. The alternate front housing 20 may also be made out of a transparent plastic such as polycarbonate so that the position of curved spring 22 can be visually verified.

Slots 21 are part of the alternate front housing 20, and are located on the right and left sides of the alternate front housing 20. Slots 21 are used to hold the ends of curved spring(s) 22. Curved spring 22 fits inside of slots 21 at each of its ends. Curved spring 22 includes rod 23 with hole 24 near its end. Hole 24 is used to attach cord 3 that attaches to the luggage. The dimensions and material strength of curved spring 22 can be selected so that the alternate embodiment of the invention makes an audible noise when a specific weight is exceeded (via electronic means or the like). If curved spring 22 is made 'stiffer', then the weight at which the scale makes a noise will be increased. Curved spring 22 is preferably made out of a plastic such as ABS, but may also be made out of other resilient materials.

Rod 23 is part of curved spring 22, and extends downward from a location near the center of the spring portion of curved spring 22. Hole 24 is located at the end of rod 23, and is used to attach cord 3. Stop walls 25 are part of alternate front housing 20, and prevent curved spring 22 from deflecting excessively, and causing it to exceed its yield strength. Stop walls 25 impact curved spring 22 when the weight on the end of curved spring 22 exceeds its 'trigger limit'. The impact of curved spring 22 with stop walls 25 will also produce a sound that indicates the specific trigger weight for the scale has been exceeded. In this way the user may be audibly warned of a condition present such that alterations can be made.

The alternate rear housing 26 attaches to the alternate front housing 20 along its perimeter with adhesive, ultrasonic welding, or with fasteners, and prevents curved spring 22 from coming out of slots 21. The alternate rear housing 26 may be attached to luggage identification card 27 with a peel and stick adhesive, or may have a writable surface permanently attached in its place. Alternatively, the alternate rear housing 26 may have an identification holder that is similar to identification holder 5.

Luggage identification card 27 typically contains information identifying the owner of the luggage and can be attached to the alternate rear housing 26 with a peel and stick tape, or may be permanently attached to the alternate rear housing 26. Luggage identification card 27 may be a business card, or any blank card that provides a writable surface for the user to handwrite identification information on.

Referring generally now to FIGS. 14-17 show various views of luggage scale and identification tag assembly 110 according to a third embodiment of the present invention.

The present invention may alternately comprise a third embodiment (TagScale) which comprises a spring 16, a (strap) cord 3, a front housing 2, a rear housing 6, a pointer 40, and a luggage identification card 27. The advantage of this particular embodiment is that it is smaller in all dimensions, uses less material, and has fewer parts than the first embodiment previously described. It should be noted that although the various embodiments have different appearing springs 16 as per structure, that 'spring' as referred to herein broadly comprises an elastic object functionally used to store mechanical energy.

The third embodiment uses a combination of spring 16 and strap (cord 3) in a single injection molded part. The geometry of spring 16 is designed in such a way as to accurately manipulate pointer 40 (needle) and pointer pusher 42 between positions depending on the weight of the luggage being weighed. Spring 16 is connected to housing 7 in this embodiment. Luggage identification card 27 is preferably located between housing 7 and spring 16.

Front housing 2 in this particular embodiment is preferably rectangular in shape (as shown), and has flange 157 extending from its lower side (where housing 7 is gripped by the user). The purpose of flange 157 is to increase the surface area of the lower side for improved comfort of the user when lifting the suitcase. Front housing 2 may have a slot in the center of its lower side which allows the strap (cord 3) to pass through. In an upper corner of front housing 2 axle 12 is attached which passes through the hub in the dial portion of pointer 40. Parallel and near to the right and left sides of front housing 2 are connection rails that mate with connection slots in the sides of the spring 16. Front housing 2 is preferably constructed of a rigid transparent plastic such as polycarbonate or ABS, and has indicia 19 printed on it to show the weight of the suitcase being weighed.

Rear housing 6 is preferably rectangular in shape, and has a flange extending from its lower side where housing 7 is able to be securely gripped by the user. The purpose of flange 157 is to increase the surface area of the lower side for improved comfort when lifting the suitcase. Rear housing 6 has a slot in the center of its lower side which allows the strap to pass through. In an upper corner of rear housing 6 axle 12 is attached which passes through the hub in the dial portion of pointer 40. Parallel and near to the right and left sides of rear housing 6 are connection rails that mate with connection slots in the sides of the spring. A notch along the upper side of the rear housing allows the identification card to slide inside housing 7, where it sits between spring 16 and rear housing 6. Rear housing 6 is preferably constructed of a rigid transparent plastic such as polycarbonate or ABS (or the like); such that luggage identification card 27 can be readily viewed from its position inside housing 7. A notch near the center bottom of rear housing 6 allows a pen or pencil tip (or other sharp-nosed instrument) to be inserted in order to help remove luggage identification card 27 from housing 7.

Spring 16 is comprised of vertical central spine 44 and at least one rib 46 on each side of spring 16 that connects to spring spine 45. Ribs 46 are connected at their outside ends along each side by connection bar 51. Connection bar 51 has grooves that run down its center on both front and back sides, and mate with the connection rails that are part of front housing 2 and rear housing 6. At the top of spring 16 is pointer pusher 42 that extends from spring spine 45 towards the pointer dial. Pointer pusher 42 pushes pointer 40 when spring 16 is compressed. At its bottom, spring 16 is connected to the strap, and preferably, spring 16 and strap are both made out of a single piece of strong, flexible plastic, such as nylon.

The strap is attached to spring 16 at its upper end, and is used to secure the scale to a piece of luggage. The structure of the strap is similar to the structure of a nylon flexible locking tie strap commonly in use. In embodiments with the ribbed deformation member, it and the tie strap may be made out of one material. It has a slot near its upper end which engages with the lower end of the strap after the strap is wrapped around a suitcase handle. Notches near the lower end of the strap allow the length of the strap to be adjusted to fit suitcase handles of different sizes making the device universal in nature. The strap is preferably made out of a strong flexible material such as nylon; however other suitably equivalent materials may be used. The strap and spring 16 are preferably made from a single piece of injection molded plastic.

Pointer 40 (needle) indicates the weight of an object secured to the scale by pointing at indicia 19 (arranged in an arcuate configuration in this particular embodiment) along the side of the scale front housing 2 opposite pointer pivot 41. Pointer 40 has a dial at one end with a hub in the center of the dial through which axle 12 passes from either front housing 2 or rear housing 6. Pointer 40 is manually able to be reset by the user by turning the dial, and is moved by pointer pusher 42 when spring 16 is compressed by a suitcase being weighed. The hub of pointer 40 fits snugly with axle 12 in housing 7 so that friction between the hub and axle 12 prevents pointer 40 from moving when spring 16 returns to its uncompressed position. Pointer 40 is preferably made out of a rigid plastic such as polycarbonate.

Luggage identification card 27 is preferably a business card, but may also be a plain or lined card with identification written on it. Luggage identification card 27 is inserted into the TagScale through a slot in its upper side, and resides between spring 16 and rear housing 6. Luggage identification card 27 is preferably made out of cardboard.

Figure 18:
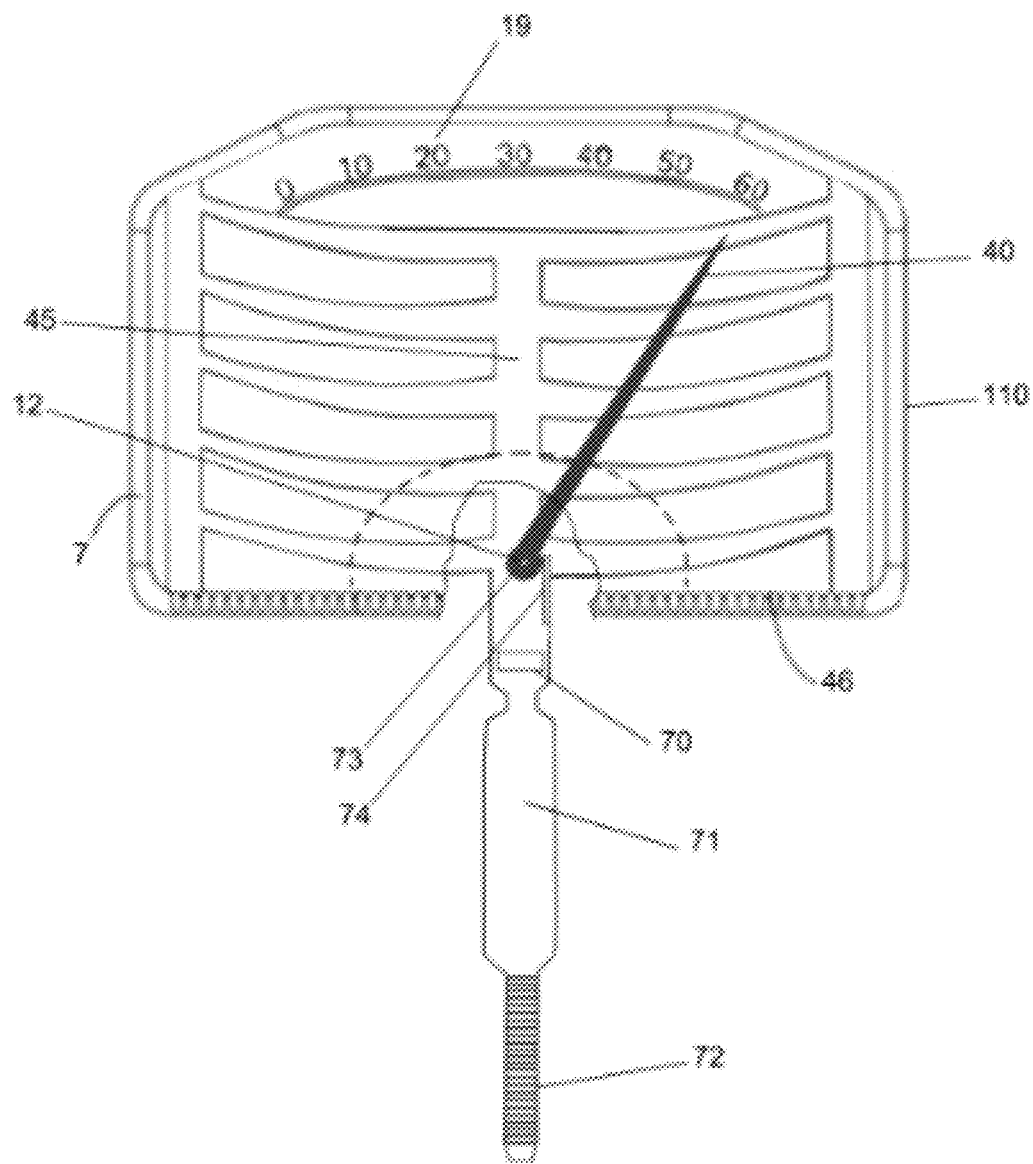
FIG. 18 is a front perspective view illustrating the luggage scale and identification tag according to a fourth embodiment of the present invention.

Referring now to FIG. 18 showing a front perspective view illustrating luggage scale and identification tag assembly 110 according to a fourth embodiment of the present invention.

In the fourth embodiment pointer 40 may pivot from the bottom center of the scale, and is able to be moved via rack gear 74 and pinion gear 73. Rack gear 74 is attached to spring spine 45, and pointer 40 is moved by pinion gear 73. Pinion gear 73 revolves around a cylindrical axle concentric to that of pinion gear 73. Axle 12 attached to pointer 40 passes through the cylindrical axle, and fits tightly enough inside the cylindrical axle to prevent accidental rotation of axle 12. Pointer 40 is attached to axle 12, and is pushed by pointer pusher 42 that protrudes from pinion gear 73, and engages with the edge of pointer 40. Axle 12 passes through a hole in the front of housing 7, and is held in place by reset knob 180 that is attached to the axle on the outside of housing 7. Spring spine 45 passes through a hole at the bottom of housing 7, which provides just enough clearance to prevent significant friction with spring spine 45, and thereby keeps rack gear 74 in contact with pinion gear 73. Strap 71 is connected to spring spine 45, or may be molded together as one part with spring spine 45. Strap 71 is similar to tie straps commonly in use (such as those sold under the tradename zip tie®), and includes toothed area 72, and slot area 70, which engages with toothed area 72 when it is inserted into slot area 70, and thereby allows the strap to be attached to the handle of a suitcase.

Figure 19:
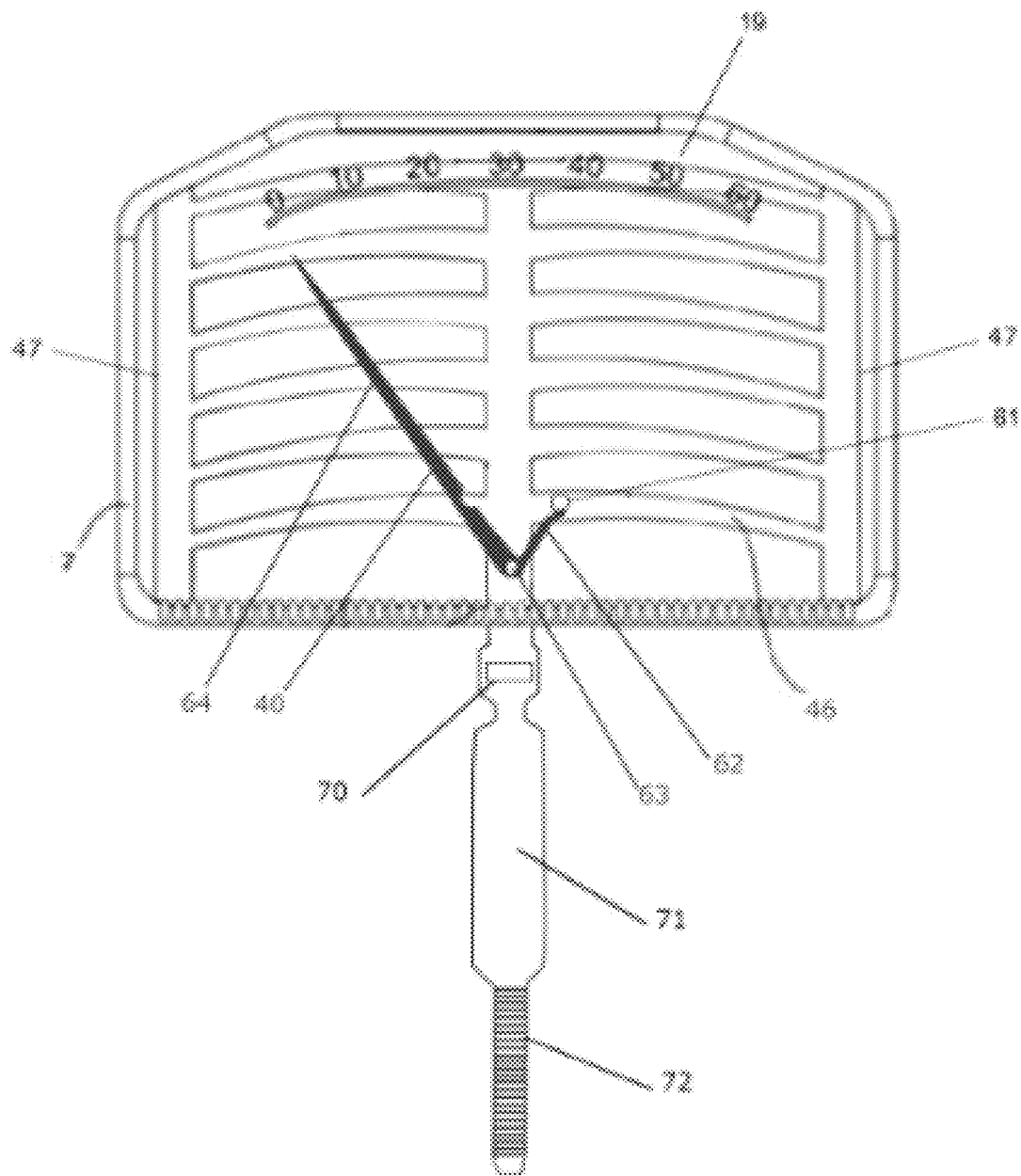
FIG. 19 is another front perspective view illustrating the luggage scale and identification tag with a pointer showing weight applied according to a fourth embodiment of the present invention.

Referring now to FIG. 19 showing a front perspective view illustrating luggage scale and identification tag assembly 110 according to a fifth embodiment of the present invention. FIG. 19 shows luggage scale and identification tag assembly 110 when pointer 40 is set to 0 lbs with no weight applied to the strap. Vertical portion 147 connects to housing 7 by being pinned, or screwed or glued to the housing. Pointer pusher 42 is preferably an integral part of the spring.

In the fifth embodiment of the present invention, pointer 40 may pivot from the bottom center of the scale around axle 63. Pointer 40 is one arm of a lever shown as bellcrank 64, and axle 63 passes through and connects to the front of housing 7. Rod 61 protruding from spring rib 46 pushes against bellcrank arm 62 when the luggage weight is applied to strap 3, and causes bellcrank arm 62 and pointer 40 to rotate about axle 63, thereby indicating the weight of the luggage. When weight is removed from strap 3, spring rib 46 returns to its original position, but bellcrank 64 is held in place by friction between housing 7 and axle 63, so pointer 40 continues to point to the same weight indicia 19, thereby still indicating the weight of the luggage item. The user must manually reset pointer 40 so that it points to 0 prior to weighing the next luggage item.

Figure 22:
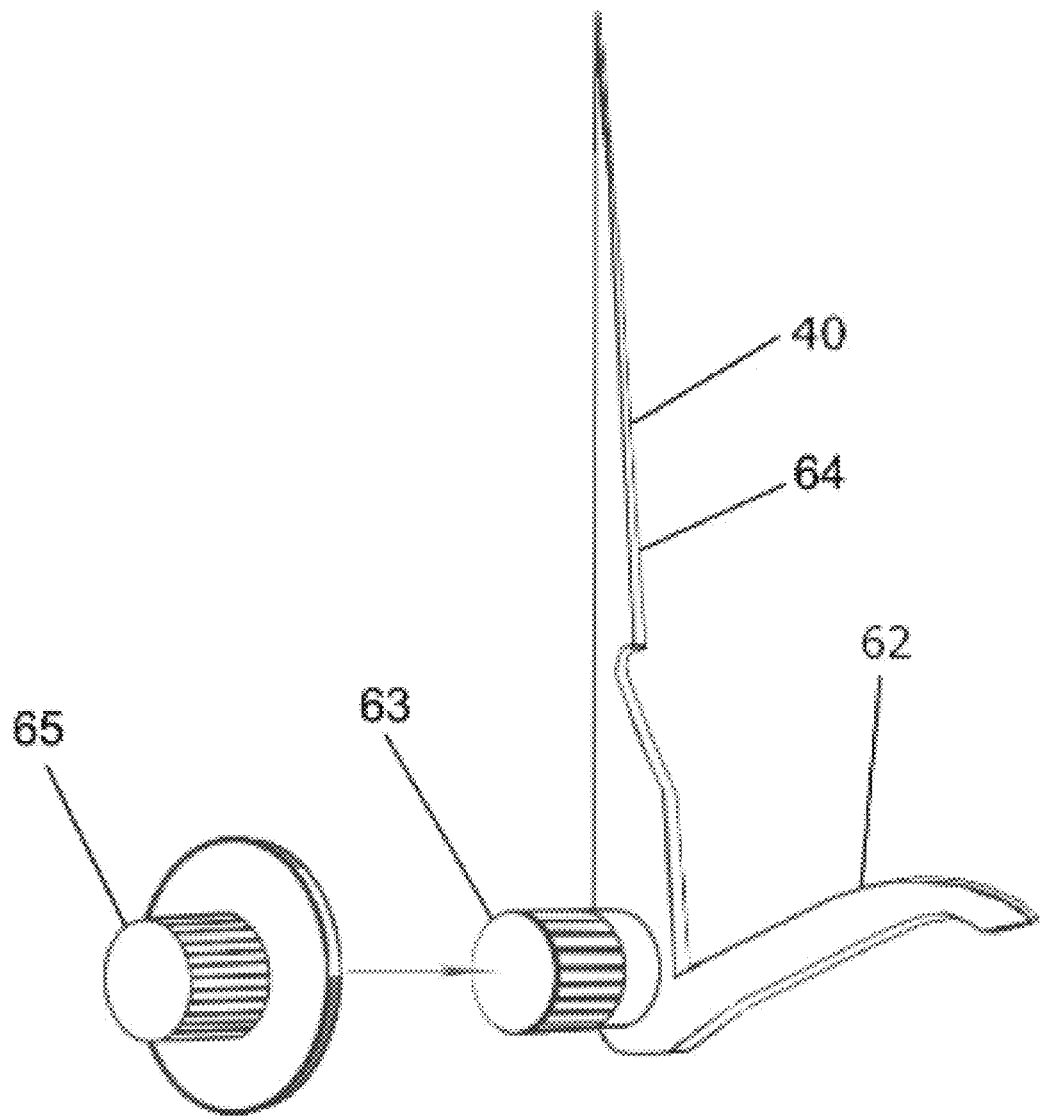
FIG. 22 is a perspective view illustrating a bellcrank arm, pointer and reset knob according to a fourth embodiment of the present invention.

Referring now to FIG. 22 showing a front perspective view illustrating bellcrank 64 as it relates to the fifth embodiment of the present invention.

Bellcrank 64 comprises pointer (arm) 40 which is connected to axle 63 and lever arm 62. Axle 63 passes through a hole in the transparent housing front 7 (not shown), and is attached to reset dial 65 by press fit, or by bonding, or by other means. Reset dial 65 is used to rotate the pointer until it points to the 0 weight indicia before using the scale to weigh a luggage item. Bellcrank 64 shown represents one lever configuration that can be used in order to manipulate the pointer, however, other lever configurations can also be used to manipulate pointer 40.

Figure 20:
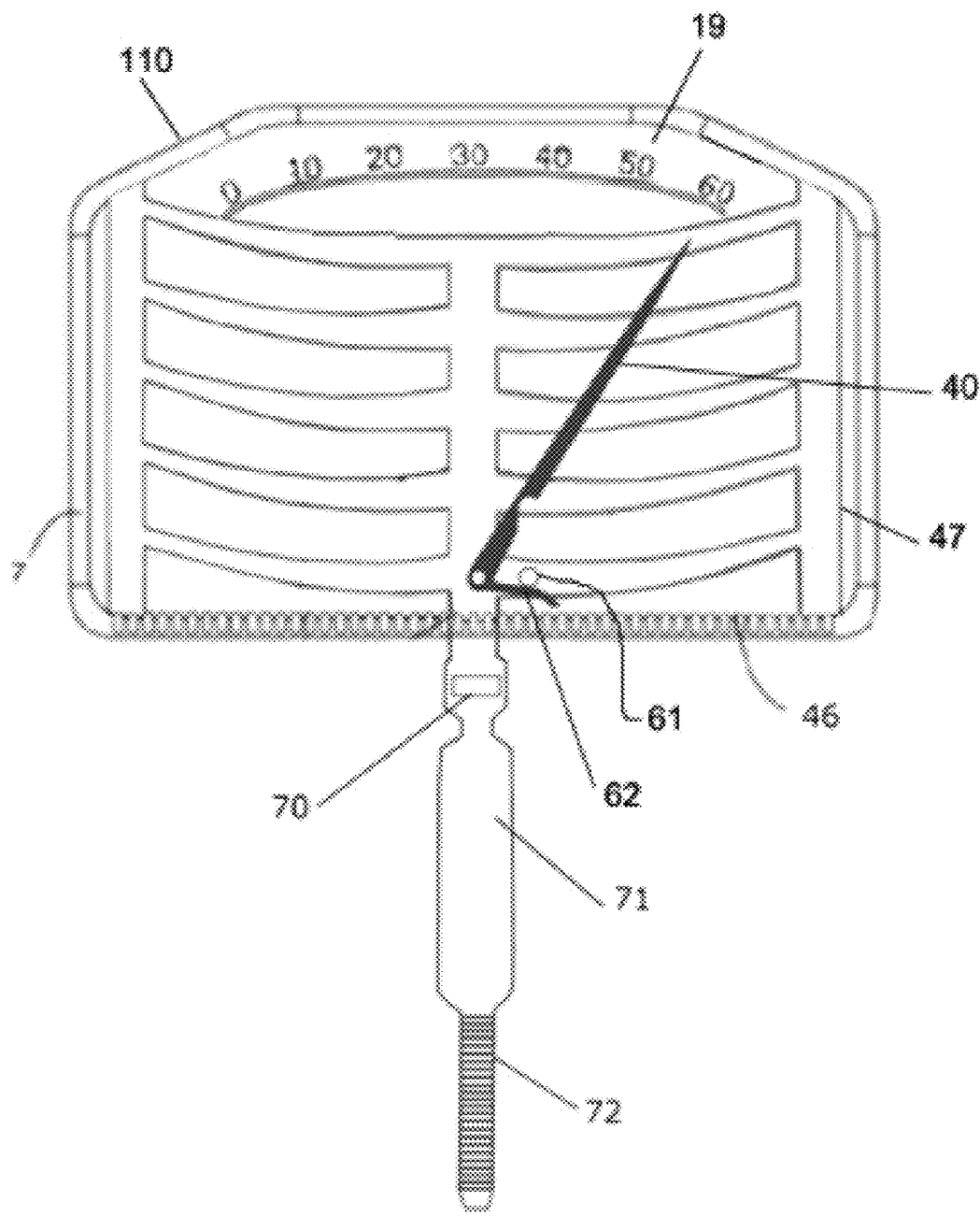
FIG. 20 is a front perspective view illustrating the luggage scale and identification tag according to a fourth embodiment of the present invention.

Referring now to FIG. 20 showing a front perspective view illustrating luggage scale and identification tag assembly 110 according to a fifth embodiment of the present invention. FIG. 20 shows the luggage scale when 60 lbs of weight has been applied to the strap.

Figure 21:
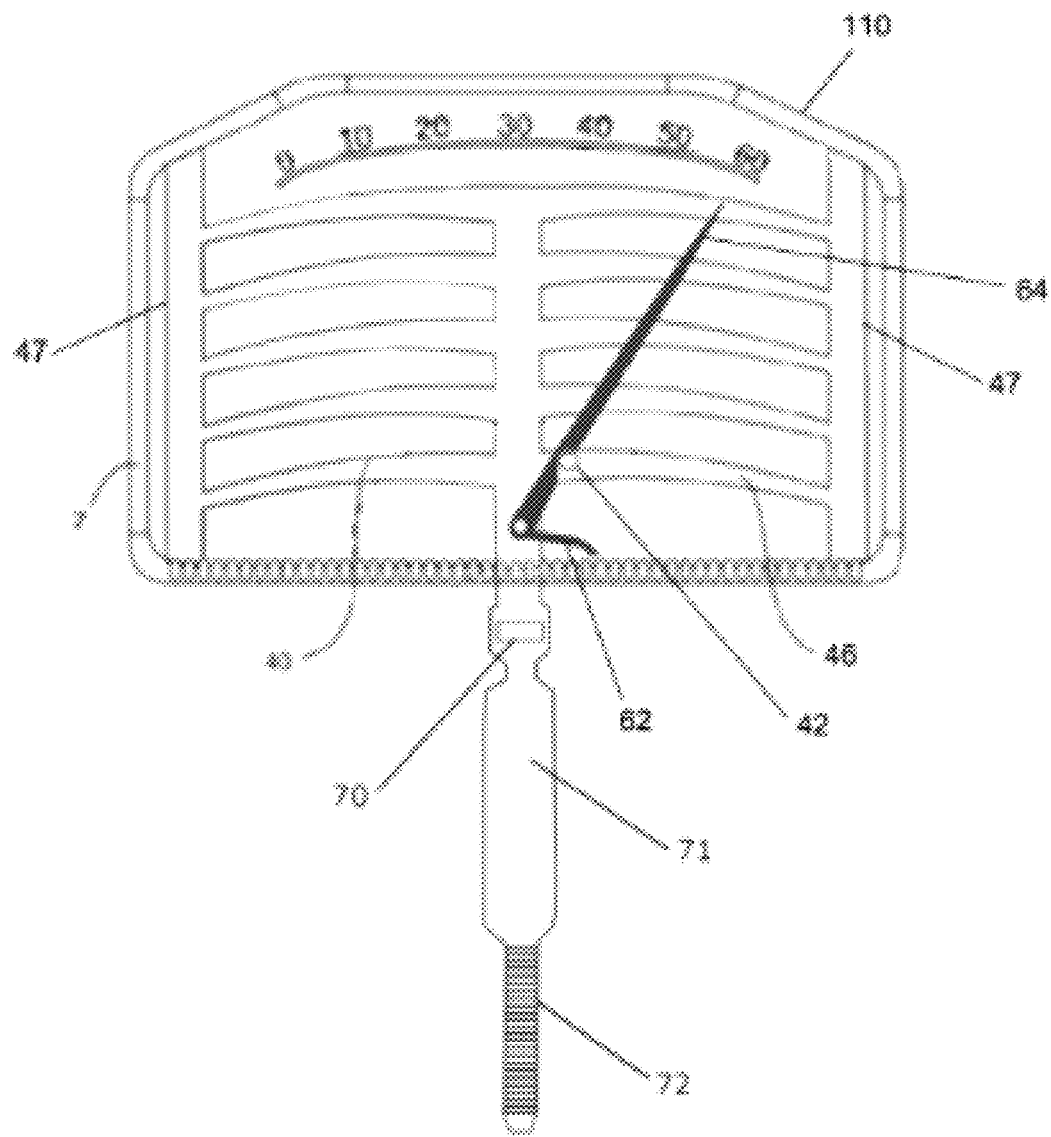
FIG. 21 is another front perspective view illustrating the luggage scale and identification tag according to a fourth embodiment of the present invention.

Referring now to FIG. 21 showing a front perspective view illustrating luggage scale and identification tag assembly 110 according to a fifth embodiment of the present invention. FIG. 21 shows luggage scale and identification tag assembly 110 when 60 lbs of weight has been applied to the strap and then removed, leaving pointer 40 still pointing at the indicial labeled 60.

Figure 23:
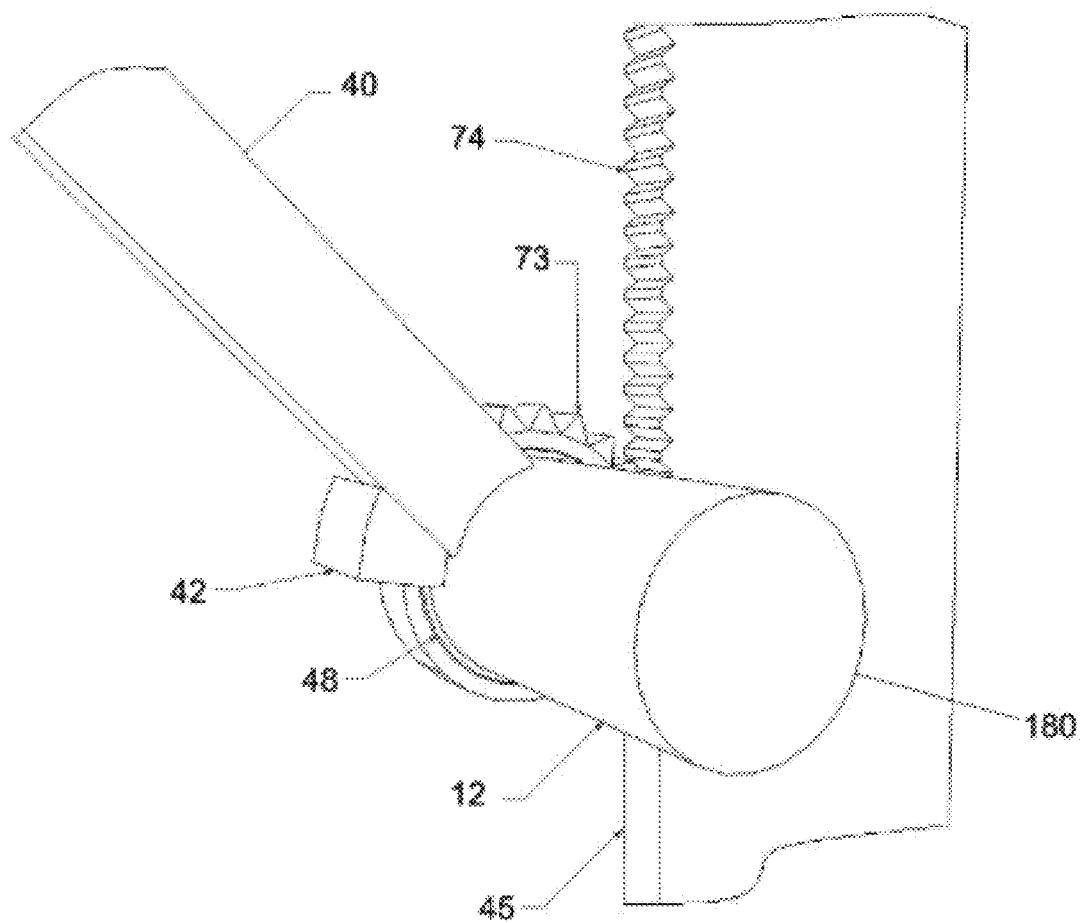
FIG. 23 is a detailed perspective view showing an alternate rack and pinion configuration for driving the pointer on the luggage scale. The housing is not shown for clarity.
Figure 24:
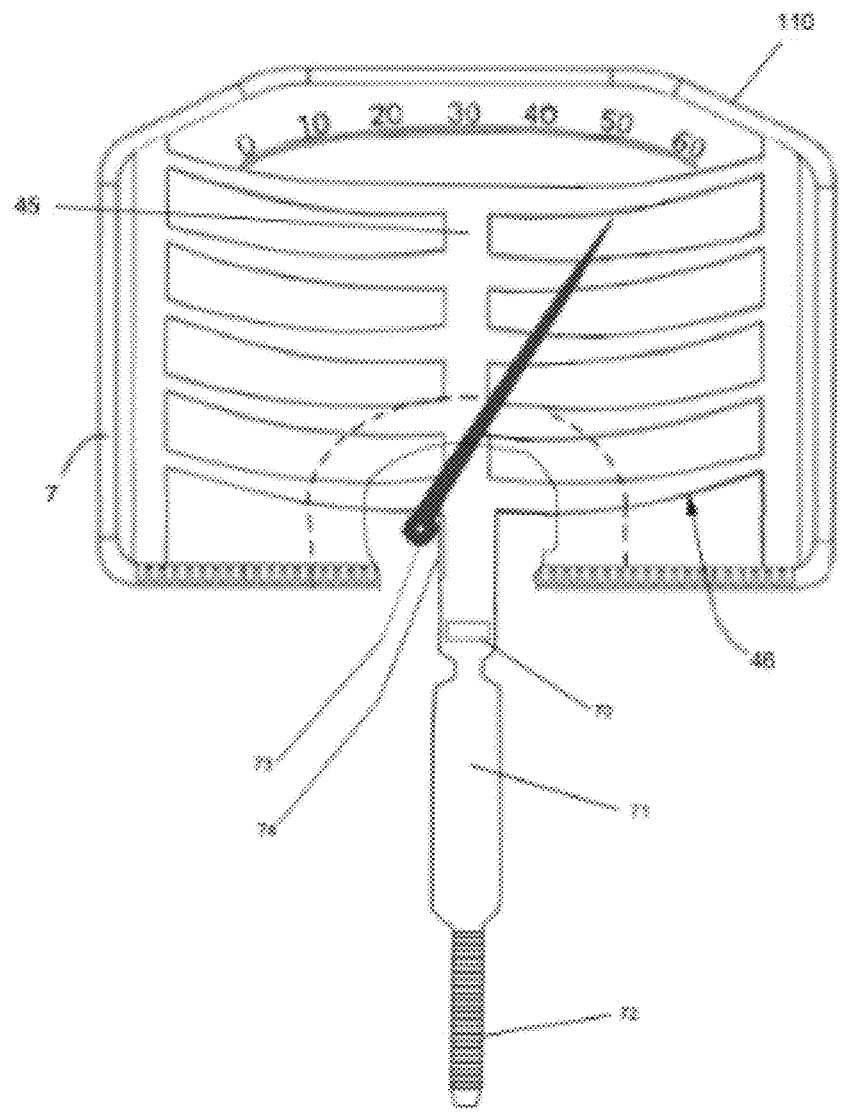
FIG. 24 is a detailed perspective view showing the alternate rack and pinion configuration for driving the pointer on the luggage scale as in FIG. 23.

FIG. 23 is a detailed perspective view showing an alternate rack and pinion configuration for driving pointer 40 on luggage scale and identification tag assembly 110. The housing (7) is not shown for clarity. FIG. 24 shows a front perspective view illustrating luggage scale and identification tag assembly 110 according to the fifth embodiment of the present invention.

Rack gear 74 is built into the side of spring spine 45 and drives pinion gear 73 in a clockwise direction when spring spine 45 moves downward due to the weight of the suitcase to which it is attached. When pinion gear 73 rotates clockwise, pointer pusher 42 pushes on the left side of pointer 40 and moves pointer 40 in a clockwise direction. Pinion gear 73 is separated from reset knob 180 by a cylinder attached to housing 7 and between pinion gear 73 and reset knob 180 so when the weight is removed from spring spine 45 and rack gear 74 returns to its original position, and pinion gear 73 returns to its original position, pointer 40 does not rotate with pinion gear 73, thereby allowing the user to read the weight of the suitcase. Reset knob 180 passes through a hole in housing 7 of the scale, and may be secured on the outside of housing 7 with an additional knob that is attached with adhesive or other means. When weighing the next item, the user must manually reset pointer 40 by turning reset knob 180 counterclockwise.

Figure 25:
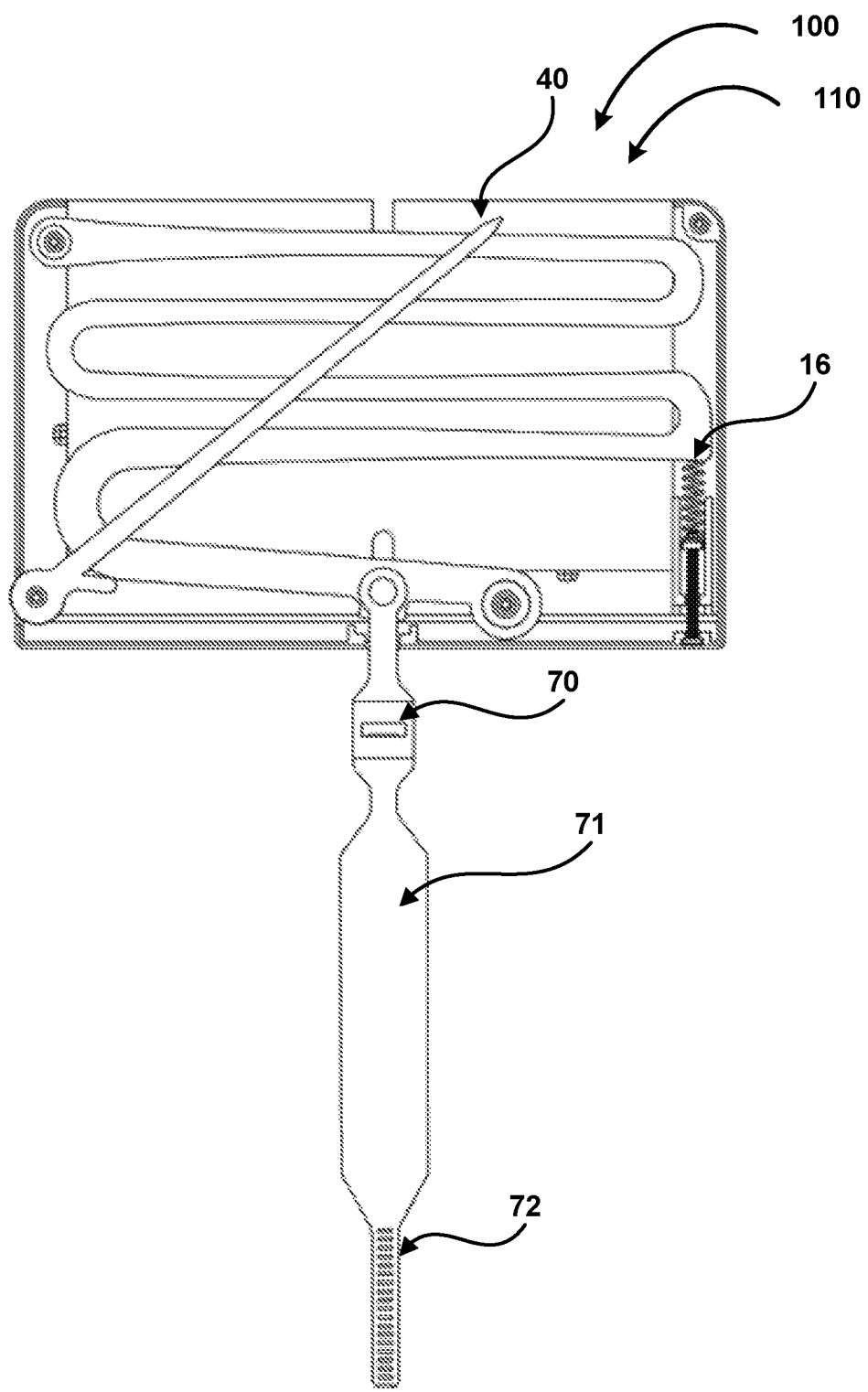
FIG. 25 is a detailed front perspective view according to a most preferred embodiment of the present invention having a mostly flat deformation member.
Figure 26:
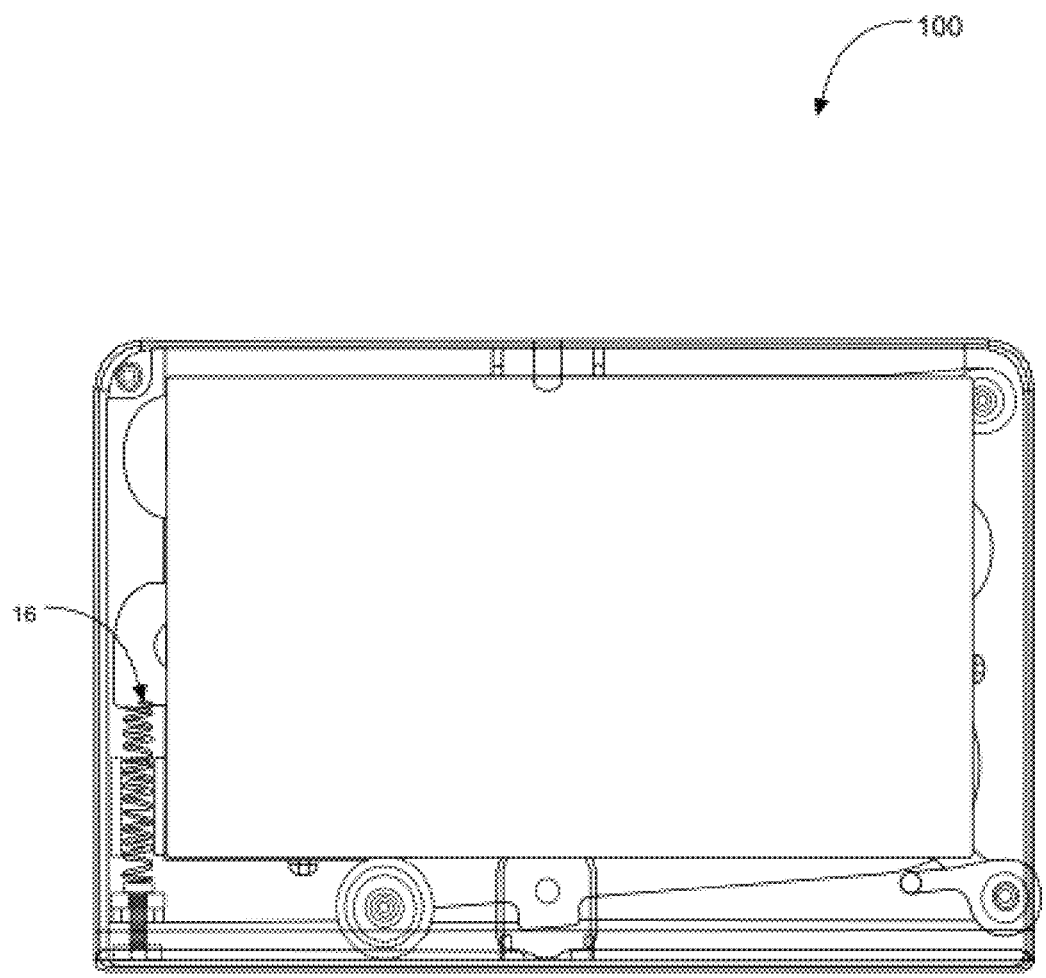
FIG. 26 is a detailed rear perspective view according to a most preferred embodiment of the present invention of FIG. 25.

FIGS. 25-26 are detailed perspective views according to a most preferred embodiment of the present invention. The device in simplified versions is able to couple to luggage with a tie strap. In combination, the lever and the spring provide a superior luggage scale. In this embodiment, the present invention comprises a mostly flat deformation member which may be deformed when cord 3 is pulled in a downward direction. Certain embodiments may comprise tie strap and/or cord 3.

In this embodiment the spring is attached to the housing at each end of the zig zag. The cord or tie strap is attached to the spring at the bottom of the scale in the middle. When the spring is deflected is pushes down on a tab protruding from the pointer, causing the pointer to deflect. When the suitcase it lowered to the floor, the pointer remains in place so the user can read the weight of the suitcase. The pointer is reset to the 0 position before each use by the user with the small knob that protrudes from the housing. A small adjustment spring for fine tuning the adjustment of the scale is located in the lower corner of the housing on the side opposite the pointer knob. The adjustment spring pushes against the spring, and can be adjusted by turning the screw that goes through the spring, which causes the nut to compress the spring more or less depending on the direction the screw is turned. In case it is relevant, we departed from the previous design because of difficulties getting sufficient deflection of the spring without yielding the spring, and also because the plastic spring was sensitive to temperature variation.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment(s) were chosen and described in order to best explain the principles of the present invention and its practical application, to thereby enable others skilled in the art to best utilize the present invention and various embodiments with various modifications as are suited to the particular use contemplated.

The invention claimed is:

1. A luggage scale and identification tag system comprising:
   a) a luggage scale and identification tag assembly having;
      i) a housing with:
         a hollow interior cavity,
         at least one upper side,
         a lower side, and
         a front side;
      ii) a scale mechanism contained within confines of said hollow interior cavity of said housing;
      iii) a cord connected to said scale mechanism;
      iv) an audible sounder;
      v) identification attached to said housing; and
      vi) a weight display;
   b) wherein said luggage scale and identification tag and said audible sounder are in functional combination;
   c) wherein said luggage scale is structured and arranged with said cord for attachment to a suitcase comprising luggage;
   d) wherein said luggage scale and identification tag assembly comprises said housing, said scale mechanism, said identification, said cord, and said weight display in functional combination;
   e) wherein said housing comprises said hollow interior cavity, parameters of said hollow interior cavity are defined by said at least one upper side, said lower side, and said front side;
   f) wherein said scale mechanism comprises a mostly flat deformation member is structured and arranged within said hollow interior cavity and further structured and arranged with said cord to sense a weight of said luggage attached to said cord during a weigh-in-period;
   g) wherein said identification is structured and arranged with said weight display to display information related to an owner of said luggage without visually obstructing said weight display;
   h) wherein said weight display, structured and arranged with audible sounder, provides a audible means whereby a user is able-to readily determine said weight of said luggage held by said cord exceeds a pre-determined weight; and
   i) wherein said luggage scale and identification allows the user to weigh said luggage in a remote location to determine said weight of the luggage.

2. The luggage scale and identification tag system of claim 1, wherein said identification is removable from an identification tag compartment.

3. A luggage scale and identification tag system comprising:
   a) a luggage scale and identification tag assembly having;
      i) a housing with:
         a hollow interior cavity,
         at least one upper side,
         a lower side, and
         a front side;
      ii) a scale mechanism contained within confines of said hollow interior cavity of said housing;
      iii) a cord connected to said scale mechanism near said lower side of said housing;
      iv) an audible sounder; and
      v) identification holder in functional combination with said housing
   b) wherein said luggage scale and identification system comprises said luggage scale and identification assembly;
   c) wherein said scale mechanism is structured and arranged with said audible sounder such that said audible sounder sounds for a suitcase weighing greater than a pre-determined suitcase weight;
   d) wherein said luggage scale and identification assembly comprises said housing, said scale mechanism, said identification, said cord, and said weight display in functional combination;
   e) wherein said housing comprises said hollow interior cavity, parameters of said hollow interior cavity are defined by said at least one upper side, said lower side, and said front side;
   f) wherein said scale mechanism comprises a mostly flat deformation member structured and arranged within said hollow interior cavity and said cord to sense a weight of luggage attached to said cord during a weigh-in-period whereby said mostly flat deformation member is; is deformed by the weight of luggage attached to said cord
   g) wherein said luggage scale is structured and arranged with audible sounder to indicate to an owner of the user if said weight exceeds a predetermined amount; and
   h) wherein said luggage scale and identification system allows the user to weigh said luggage in a remote location to determine if said weight of said luggage exceeds the predetermined amount.

4. The luggage scale and identification tag system of claim 3, wherein said front side of said housing is transparent in order to allow viewing of an identification tag that is structured and arranged within said housing.

5. The luggage scale and identification tag system of claim 4, wherein said identification is removable from an identification tag compartment.

6. The luggage scale and identification tag system of claim 3, wherein said mostly flat deformation member and cord combination once separated renders said luggage scale and identification tag assembly unusable for weighing.

7. The luggage scale and identification tag system of claim 3, wherein said mostly flat deformation member and cord combination comprises a flexible locking cable tie.

8. The luggage scale and identification system of claim 2, wherein said weight display includes a magnifying lens.

9. The luggage scale and identification tag system of claim 1, wherein said scale mechanism includes a spine located near its center with ribs on either side that are attached to said housing of said luggage scale and identification tag assembly.

10. The luggage scale and identification tag system of claim 1, wherein said scale mechanism comprises a bell crank that is connected to said cord.

11. The luggage scale and identification system of claim 1, wherein said weight display comprises a pointer.

12. A luggage scale and identification system comprising:
 a) a luggage scale and identification assembly having;
  i) a housing with:
   a flange;
   a hollow interior cavity,
   at least one upper side,
   a lower side, and
   a front side;
  ii) a scale mechanism contained within confines of said hollow interior cavity of said housing;
  iii) a cord connected to said scale mechanism near said lower side of said housing;
  iv) an identification holder on said housing; and
  v) a weight display comprising:
   a pointer;
   a knob;
   an adjustment spring; and
   an adjustment screw;
 b) wherein said pointer points to at least one weight of a luggage;
 c) wherein said knob is structured and arranged said scale mechanism to reset said pointer to a zero-weight position of said weight display before a user weighs the luggage;
 d) wherein said adjustment spring is structured and arranged with said housing, said adjustment screw, and said scale mechanism such that the user can increase accuracy at which said scale mechanism weighs the luggage;
 e) wherein said adjustment spring is structured and arranged with said adjustment screw such that force said adjustment spring exerts against scale mechanism is adjusted when the user turns said adjustment screw;
 f) wherein said flange is structured and arranged with said housing to increase at least one external surface area of said housing;
 g) wherein said cord is structured and arranged as a flexible locking cable tie that is threaded through and end of said cord and tightened so as to fasten said luggage scale and identification assembly to the luggage;
 h) wherein said luggage scale and identification system comprises said luggage scale and identification assembly;
 i) wherein said luggage scale and identification assembly comprises said housing, said scale mechanism, said identification holder, said cord, and said weight display in functional combination;
 j) wherein said housing comprises said hollow interior cavity, parameters of said hollow interior cavity are defined by said at least one upper side, said lower side, and said front side;
 k) wherein said scale mechanism comprises a mostly flat deformation member normally in tension structured and arranged such that each end of said mostly flat deformation member moves mostly rectilinearly within a channel while sensing a weight of luggage attached to said cord during a weigh-in-period whereby said mostly flat deformation member is deformed when said cord is pulled in a downward direction;
 l) wherein said identification holder is structured and arranged with said weight display to display information related to an owner of the luggage without visually obstructing said weight display;
 m) wherein said weight display provides a visual means whereby a user is able to determine said weight of the luggage held by said cord; and
 n) wherein said luggage scale and identification tag system allows the user to weigh the luggage in a remote location to determine said weight of the luggage.

13. The luggage scale and identification tag system of claim 12, wherein said front side of said housing comprises indicia useful to make a visual determination of said weight of the luggage held by said cord.

14. The luggage scale and identification tag system of claim 13, wherein said weight display comprises a rotating pointer with a pivot for said rotating pointer located near a top of said housing.

15. The luggage scale and identification tag system of claim 12, wherein said mostly flat deformation member consists of a centrally located vertical spine with a plurality of ribs connected to said spine and to said housing of said luggage scale.

16. The luggage scale and identification tag system of claim 12, wherein the mostly flat deformation member is attached to a tie strap at its lower end.

17. The luggage scale and identification tag system of claim 16, wherein the tie strap is releasable.

18. The luggage scale and identification tag system of claim 15, wherein deformation of said mostly flat deformation member causes rotation of a pointer.

19. The luggage scale and identification tag system of claim 12, wherein said lower side of said housing is structured and arranged with said flange to increase surface area contact on a hand of the user whereby downward force is dispersed into hand via said flange to minimize discomfort during said weigh-in-period.

20. A luggage scale comprising:
 a) a scale mechanism;
 b) a cable tie connected to said scale mechanism; and
 c) an audible sounder;
 d)
 e) wherein said luggage scale is structured and arranged with said cable tie for attachment to a suitcase;
 f) wherein said luggage scale comprises: said scale mechanism, said cable tie, and said weight display in functional combination; and
 g) wherein said scale mechanism is structured and arranged with audible sounder to provide an audible means whereby a user is able to readily determine said weight of said luggage held by said cord exceeds a pre-determined weight.

21. The luggage scale of claim 20 wherein said cable tie is releasable.

* * * * *